United States Patent
Lin et al.

(10) Patent No.: US 10,653,980 B2
(45) Date of Patent: May 19, 2020

(54) CONNECTION-FREE FILTER CAPSULE APPARATUS

(71) Applicant: Saint-Gobain Performance Plastics Corporation, Solon, OH (US)

(72) Inventors: ZhenWu Lin, Pasadena, CA (US); Hong Shen, Omaha, NE (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/944,742

(22) Filed: Apr. 3, 2018

(65) Prior Publication Data

US 2018/0221792 A1    Aug. 9, 2018

Related U.S. Application Data

(63) Continuation-in-part of application No. 15/075,748, filed on Mar. 21, 2016.
(Continued)

(51) Int. Cl.
*B01D 35/30* (2006.01)
*B01D 29/11* (2006.01)
(Continued)

(52) U.S. Cl.
CPC .......... *B01D 29/114* (2013.01); *B01D 27/10* (2013.01); *B01D 35/153* (2013.01); *B01D 35/30* (2013.01);
(Continued)

(58) Field of Classification Search
CPC ................ B01D 29/114; B01D 35/153; B01D 46/0013; B01D 27/10; B01D 46/0006;
(Continued)

(56) References Cited

U.S. PATENT DOCUMENTS

| 5,545,242 A | 8/1996 | Whitlock et al. |
| 2005/0072725 A1 | 4/2005 | Swanson |

(Continued)

FOREIGN PATENT DOCUMENTS

| EP | 1179154 B1 | 4/2005 |
| EP | 2 422 837 A1 | 2/2012 |

(Continued)

*Primary Examiner* — Thomas M Lithgow
(74) *Attorney, Agent, or Firm* — Lorusso & Associates

(57) ABSTRACT

Disclosed are capsule/tube connector/tube assemblies that eliminate a connection point in a filter capsule apparatus. A relatively soft tube is thermally or sonically bonded to a relatively hard tube connector that may have a tube receiving bore, a frustoconical tube receiving channel or a straight tube receiving channel. The tube connector is bonded to a filter capsule port. The manufacturing process can be either a one-step process bonding the tube and capsule during formation of the tube connector in one step, or a two-step process that binds the tube to the tube connector in one step and binds the tube connector to a filter capsule port in a second step. Single and dual-walled tubes may be used as well as single and dual-walled tubes having reinforcing material superposed about or embedded in the tube wall(s). A tube support collar is also disclosed. Also disclosed are capsule port/tube connector/tube combinations in which capsule port tips and tube connectors are combined to create tube-receiving gaps or channels to secure a tube to a capsule assembly. Multiple capsule/tube connector/tube assemblies may be connected to form a filter train.

20 Claims, 15 Drawing Sheets

Related U.S. Application Data

(60) Provisional application No. 62/480,565, filed on Apr. 3, 2017.

(51) Int. Cl.
| | |
|---|---|
| *B01D 35/153* | (2006.01) |
| *B01D 46/00* | (2006.01) |
| *B01D 46/10* | (2006.01) |
| *B01D 27/10* | (2006.01) |

(52) U.S. Cl.
CPC ..... *B01D 46/0005* (2013.01); *B01D 46/0012* (2013.01); *B01D 46/0013* (2013.01); *B01D 46/10* (2013.01); *B01D 46/0006* (2013.01)

(58) Field of Classification Search
CPC ........ B01D 46/10; B01D 35/00; B01D 27/00; B01D 27/08; B01D 29/90; B01D 29/92; B01D 2201/302; B01D 2201/303; B01D 2201/306; B01D 35/30
USPC .................................................. 210/232, 541
See application file for complete search history.

(56) References Cited

U.S. PATENT DOCUMENTS

| | | |
|---|---|---|
| 2008/0169646 A1 | 7/2008 | Werth |
| 2012/0216903 A1 | 8/2012 | Osborne |
| 2013/0043676 A1 | 2/2013 | Baker |
| 2014/0091569 A1 | 4/2014 | Spohn |
| 2016/0040814 A1* | 2/2016 | Jung ................... F16L 37/113 285/27 |
| 2016/0271528 A1 | 9/2016 | Lin et al. |

FOREIGN PATENT DOCUMENTS

| | | |
|---|---|---|
| GB | 2 000 685 A | 1/1979 |
| KR | 101177674 * | 8/2012 |

* cited by examiner

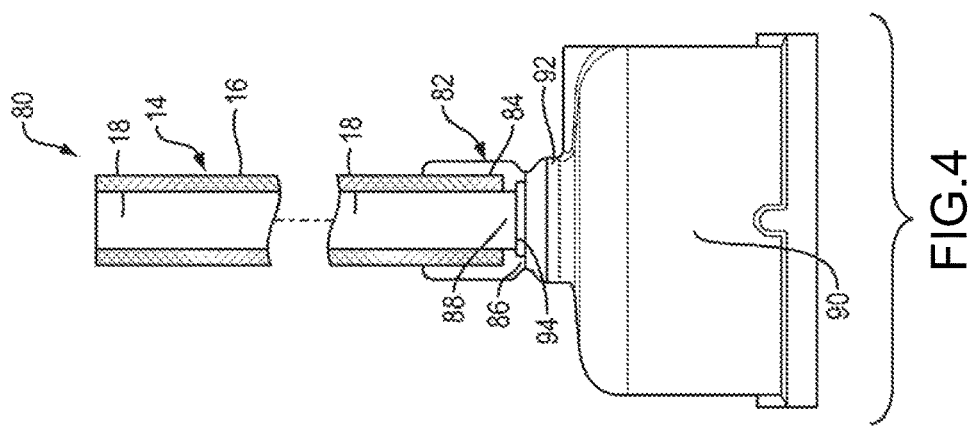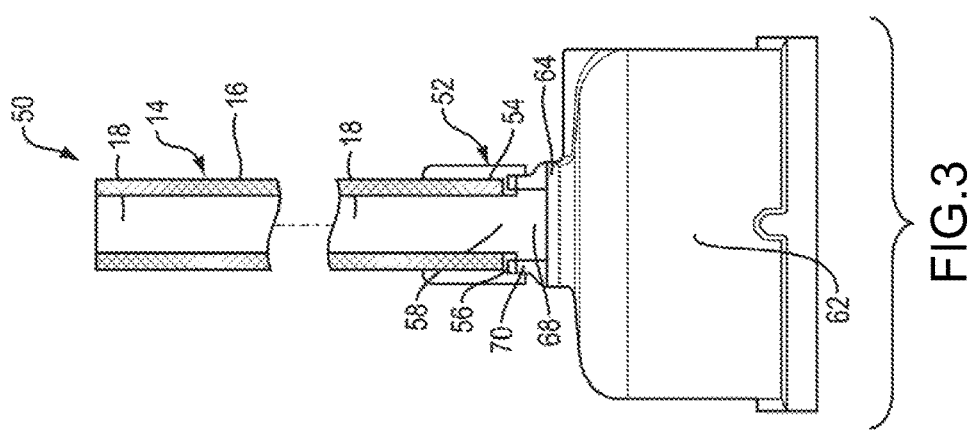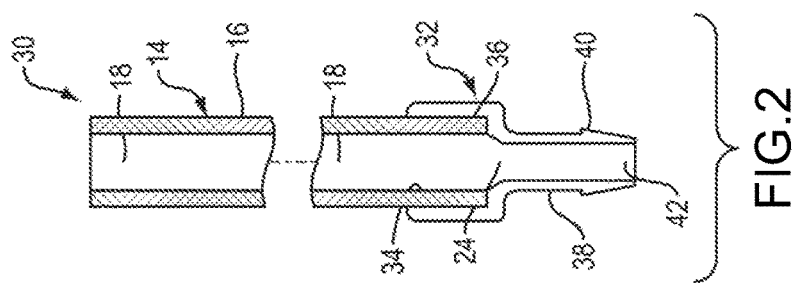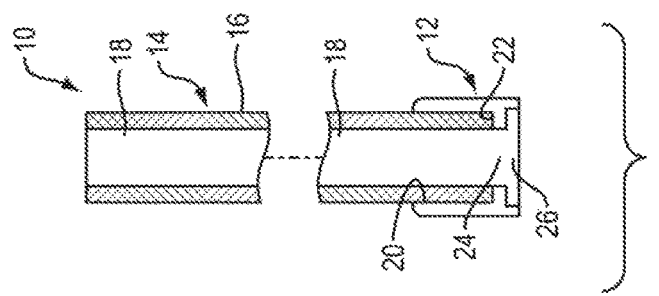

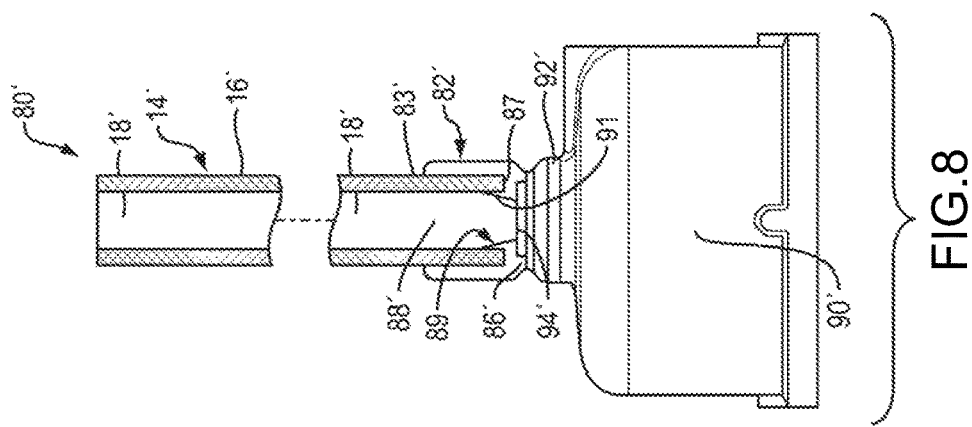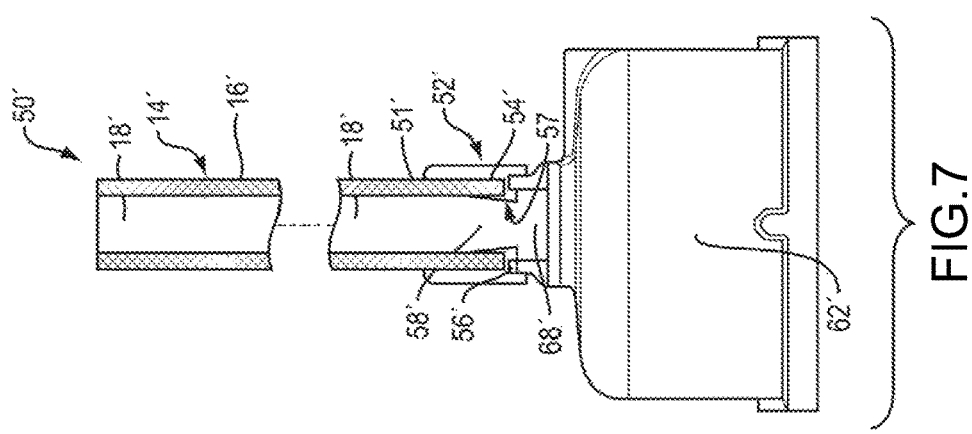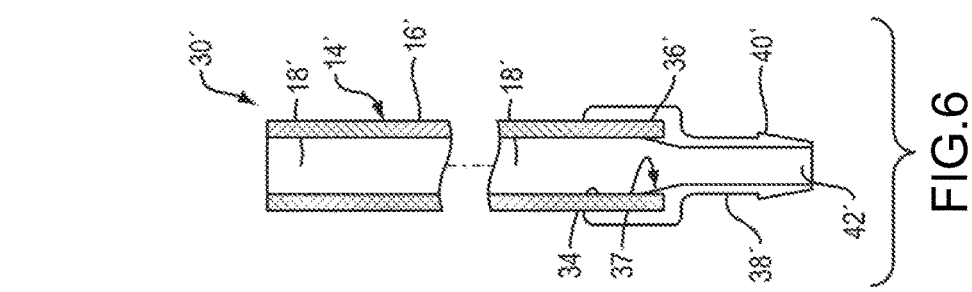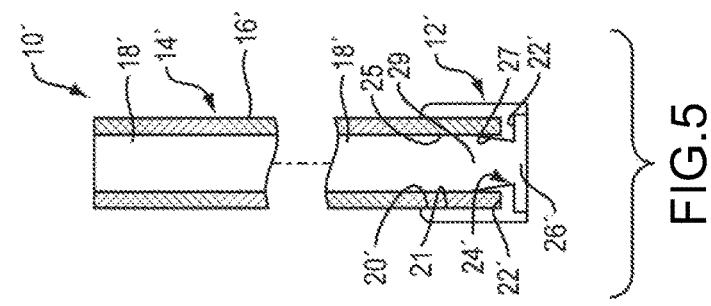

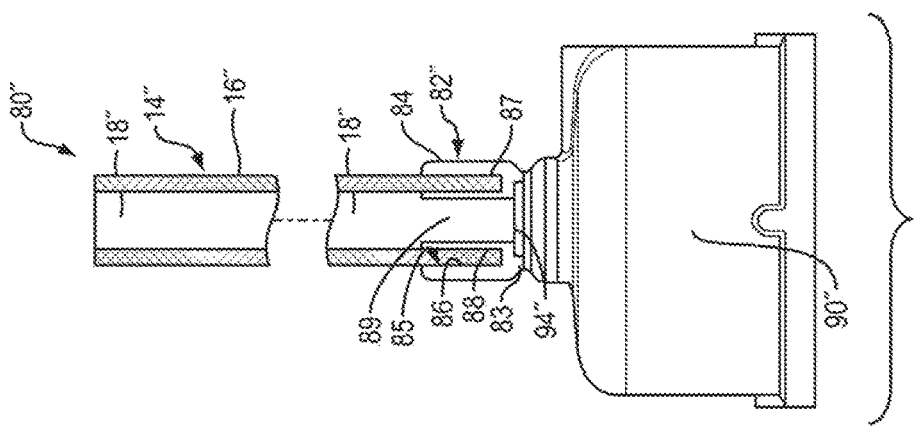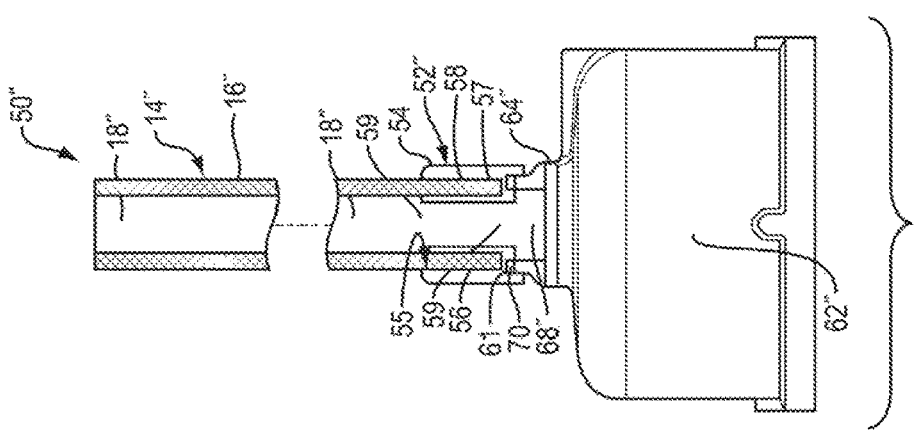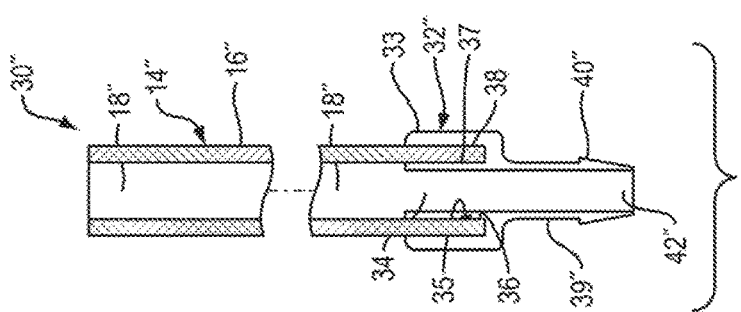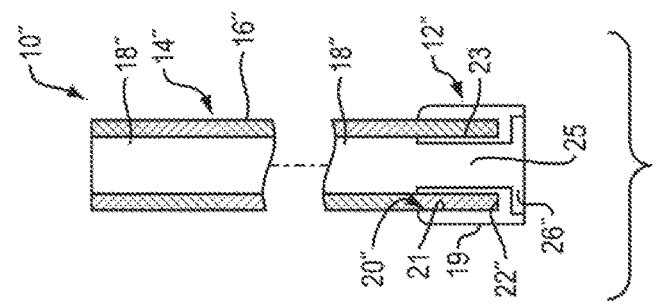

CONNECTION-FREE FILTER CAPSULE APPARATUS

CROSS-REFERENCE TO RELATED APPLICATIONS

This is a regular utility application that claims the benefit of U.S. Provisional Patent Application Ser. No. 62/480,565, filed Apr. 3, 2017, and is a continuation-in part of, and claims priority to, U.S. patent application Ser. No. 15/075,748, filed Mar. 21, 2016, which claimed the benefit of U.S. Provisional Patent Application Ser. No. 62/136,091, filed Mar. 20, 2015, the contents all of which are incorporated in their entirety herein by reference.

FIELD OF THE DISCLOSURE

The disclosure relates to filter capsule and tube combinations that eliminate a releasable connection. More particularly, the disclosure concerns combination filter shells, capsules or housings and pliable tubes that eliminate a connection and potential contamination point in a filter assembly.

BACKGROUND OF THE DISCLOSURE

To filter liquids and/or gases of undesired contaminants or impurities, filters and/or purification material, e.g., filter membranes, are used in enclosed filter housings to effectuate contaminant or impurity removal. As used herein, "filter and/or purification material" and/or "filtration material" shall mean any filter membrane, filter media, or any other material or substance used to filter fluids including liquids and gases. To deliver fluids and/or gases to the filter material for filtering, conduits in the form of tubes or pipes are used to deliver the materials to be filtered to a filter capsule containing filter material. As used herein, "filter capsule" shall mean any structure, including, but not limited to, housings, shells, disc filters, filter cages, filter cartridges and the like used to enclose filter material. The conduits can be rigid pipe or pliable tubes made from such materials as thermoplastic elastomers (TPE). For rigid pipe, connectors such as clamps, threaded couplings and the like can be used. For soft pliable tubes, hose barbs are the conventional connection choice. Each form of connection includes several drawbacks.

Rigid connectors add considerable cost and spatial inflexibility to the filter assembly, particularly with the use of tri-clamp arrangements that use a clamp to secure flanged ports with flanged tubes. The use of flanged tubes creates at least two potential contamination points. The first is the junction of the flange to the tube. In some available versions, such as those offered by Saint-Gobain, if the seal between the hard plastic or metallic flange and relatively soft tube is in any way compromised, contaminants, such as bacteria, could potentially enter the filter assembly, or, depending upon the application, permit the exit of bacterial contaminants from the filter assembly.

A second point of potential contamination is the clamp/flange juncture. Any damage to the seal between the two adjoining surfaces also could lead to potential contaminant infiltration of the filter assembly. Such events can occur with multiple filter sterilization cycles that may involve high heat or gamma radiation. The use of different materials for the tubes and connectors, each material having different characteristics, e.g., melting points and flexural moduli, can have different reactions to sterilization procedures and lead to compromised seals and seal failure.

Barbs are notoriously prone to connection failure. By design, a barb, over which a tube is secured, exposes an inner wall of a tube to defined annular or segmented acute edges that dig or bite into the tube material. This inevitably weakens the tube at the connection point and can lead to tube failure, particularly if the filter assembly and tube(s) are pressurized. Barb accessory components such as barb lock systems can further add to the mechanical stress placed on the tube at the barb connection. Pressurization of a filter system can add additional stress to the tube/barb connection and lead to tube deterioration and connection failure. Mechanical stress on the barb connection may also occur with movement of the filter assembly while the tube is connected to the assembly. Any of these potential sources of stress on the tube/barb connection can lead to contaminant infiltration or exit, depending upon the location of the tube and its assigned purpose (inlet, outlet or vent). What is needed is a soft tube filter assembly connection that eliminates the need for any clamping or barb connection systems so as to eliminate potential contamination points.

What is needed further is a tube/tube connector/capsule combination that eliminates a connection point between a relatively soft tube and a relatively rigid port that can withstand manufacturing processes as well as post-use sterilization procedures so as to maintain structural and seal integrity. What is also needed is a tube connector that improves the structural integrity of the tube/capsule connection point so as to rigidify the tube end secured to the capsule. These and other objects of the disclosure will become apparent from a reading of the following summary and detailed description of the disclosure as well as a review of the appended drawings.

SUMMARY OF THE DISCLOSURE

In one aspect of the disclosure, a capsule apparatus for enclosing filters includes a plurality of ports extending from the capsule body to receive liquid and/or gas delivery and exit tubes. The ports are dimensioned to receive the inner and/or outer diameters of the tubes. The dimensions of the port passages are further set to maintain a consistent, continual cross-sectional diameter substantially the same as the cross-sectional diameter of the tube lumen at a relaxed, or unstressed, portion of the tube to be secured to the port.

In another aspect of the disclosure, a tube connector is formed with an annular channel dimensioned to receive an end of a tube. The interior and exterior walls of the channel register against the interior and exterior walls of the tube so as to provide maximal support to the tube end. The tube is bonded to the connector to from a tube/connector subassembly for subsequent bonding to a capsule assembly.

In a further aspect of the disclosure, a tube, tube connector and filter capsule are bonded together in a single step. The connector has portions defining a first bore to receive the outer wall of the tube and a second bore dimensioned to receive a filter capsule port. In an alternative embodiment, the outer wall of the connector is dimensioned to receive the inner wall of a tube as well as an inner wall of the capsule port. In a further alternative embodiment, the connector has a bore to receive a tube end and has an outer diameter dimensioned to receive and register against an inner wall of a port. In a still further alternative embodiment, the connector has an outer diameter dimensioned to receive an inner wall of a tube and a bore to receive an outer wall of the capsule port.

In a still further aspect of the disclosure, a tube connector/ barb has portions defining a tube receiving annular channel at a proximal end whereby the inner and outer walls defining the channel are dimensioned to receive the inner and outer walls of a tube. A distal end of the connector is formed in the shape of a barb. In an alternate embodiment, the inner wall defining the annular channel is formed with an increasing diameter at an end distal from the main body of the connector, frustoconical in cross-section, to provide a tube binding surface for a combination mechanical/friction fit to further secure the tube engaged to the connector. In yet another alternate embodiment, a bore is formed in the connector dimensioned to receive and register against an outer wall of the tube.

In yet a further aspect of the disclosure, a tube/connector/ capsule port connection is formed in a single step. The connector is formed with an annular channel dimensioned to receive the annular wall of a capsule port. The connector further defines a through-bore having a cross-sectional diameter dimensioned to maintain a dimensionally consistent, continual channel similar in dimension to the cross-sectional diameter of the tube lumen at a portion of the attached tube measured at a relaxed, or unstressed, portion of the tube. In one embodiment, the connector defines a tube bore dimensioned to receive the outer wall of a tube end. In an alternative embodiment, the connector defines a second annular channel, the walls of which are spaced to receive and register against the inner and outer wall of a tube end. In a yet further alternative embodiment, the connector has an outer wall dimensioned to receive the inner wall of a tube end.

In yet another embodiment, a tube/connector/capsule port assembly is bonded in one step. The connector defines an annular channel with an inner wall having a frustoconical shape in cross-section whereby the wider portion of the inner wall extends away from the main body of the connector to provide a mechanical/friction fit to more securely engage the tube. The tube/connector/port assemblies can be dedicated to a particular function, e.g., ingress (inlet), egress (outlet), exhaust (vent) and drain (upstream or downstream).

In a yet further aspect of the disclosure, a tube/connector/ capsule port assembly is bonded in one step. The connector defines a bore with an annular wall dimensioned to receive an outer annular wall of a capsule port. An opposite end of the connector can be formed with an annular channel dimensioned to receive a tube, with an inner wall of the annular channel having a frustoconical cross-sectional shape with the larger diameter end extending toward a tube connecting end of the connector, with a bore dimensioned to receive an outer wall of the tube, or with an outer diameter dimensioned to be inserted into a tube. The connector further defines a channel dimensioned to have substantially the same cross-sectional diameter as the cross-sectional diameter of the tube lumen at a relaxed, or unstressed, portion of the attached tube.

In a still further aspect of the disclosure, a tube/connector/ capsule assembly also eliminates a connection point with the application of a modified capsule port and port connector subassembly. The capsule port and connector are formed with flanged ends that have corresponding annular interlocking structures to mechanically lock the components together to create a fluid tight seal between the components. An end of the connector opposite the flanged end defines a bore dimensioned to receive a distal end of the port and a tube end secured between the outer wall of the capsule port and the inner wall of the connector defining the bore. A channel formed in the capsule port may be dimensioned to have the same cross-sectional diameter as the cross-section diameter of the tube lumen at a relaxed, or unstressed, portion of the tube. The connector bore may be formed with a smooth or corrugated wall dimensioned to register against and secure a portion of an end of the tube to form a liquid-tight seal between the tube and the connector.

The inner annular wall of the connector and the outer wall of the capsule port may each be formed with a taper, or formed to be cylindrical and thus coaxial with a longitudinal axis of the capsule port, to mechanically compress the tube end and create a liquid-tight seal. The connector bore inner wall may be formed with a frustoconical shape that presents as a taper in cross-section, with the smaller end of the taper at either the end proximal the flanged bottom end of the connector, or distal from the connector bottom end. The capsule port outer wall may also be formed with a frustoconical shape that presents as a taper in cross-section with the smaller end of the taper either proximal to a base of the port that forms a capsule/port junction, or distal from the port base.

The three possible configurations for the connector inner wall and the three for the capsule port outer wall present nine different port/connector combinations to secure a tube to the port/connector combination when assembled. For three embodiments that incorporate a tapered port outer wall with the smaller end of the taper proximal to the capsule/port junction, an interference fit is created that requires the tube end to be secured over the relatively wide port tip. For the three embodiments that incorporate a tapered port outer wall with the smaller end of the taper distal from the capsule/port junction, a compression or friction fit is required to secure a tube end in the channel formed by the combination of the port and connector with the connector superposed about the tube end and the port. For the one embodiment that has a port cylindrical outer wall and a connector cylindrical inner wall, the gap formed between the coaxial walls has to be smaller in dimension than the thickness of the tube wall so as to compress the tube wall and secure the tube in the gap formed by the port/connector combination.

In another aspect of the disclosure, a dual-walled, optionally reinforced tube is incorporated into the tube/connector/ capsule embodiments disclosed herein. A connection end of the tube is modified to remove an end segment of the outer tube wall to maximize the tube sealing surface area and to minimize a potential contamination point in a dual-walled tube.

In yet another aspect of the disclosure, a tube connection reinforcement or support collar is formed on an end of a tube connector/over-mold to protect the connector/tube junction distal from the capsule. These and other aspects of the disclosure will become apparent from a review of the appended drawings and a reading of the following detailed description of the disclosure.

BRIEF DESCRIPTION OF THE DRAWINGS

FIG. 1 is a side partial sectional view of a tube/tube connector subassembly according to one embodiment of the disclosure.

FIG. 2 is a side partial sectional view of a tube/hose barb assembly according to another embodiment of the disclosure.

FIG. 3 is a side partial sectional view of a filter capsule/ tube/tube connector assembly according to a further embodiment of the disclosure.

FIG. 4 is a side partial sectional view of a filter capsule/tube/tube connector assembly according to another embodiment of the disclosure.

FIG. 5 is a side partial sectional view of a tube/tube connector subassembly according to a yet further embodiment of the disclosure.

FIG. 6 is a side partial sectional view of a tube/hose barb assembly according to yet another embodiment of the disclosure.

FIG. 7 is a side partial sectional view of a filter capsule/tube/tube connector assembly according to a still further embodiment of the disclosure.

FIG. 8 is a side partial sectional view of a filter capsule/tube/tube connector assembly according to still another embodiment of the disclosure.

FIG. 9 is a side partial sectional view of a tube/tube connector assembly according to yet another embodiment of the disclosure.

FIG. 10 is a side partial sectional view of a tube/tube barb assembly according to a further embodiment of the disclosure.

FIG. 11 is a side partial sectional view of a tube/tube connector/filter capsule assembly according to a still further embodiment of the disclosure.

FIG. 12 is a side partial sectional view of a tube/tube connector/filter capsule assembly according to yet another embodiment of the disclosure.

DETAILED DESCRIPTION OF THE DISCLOSURE

Figure 15:
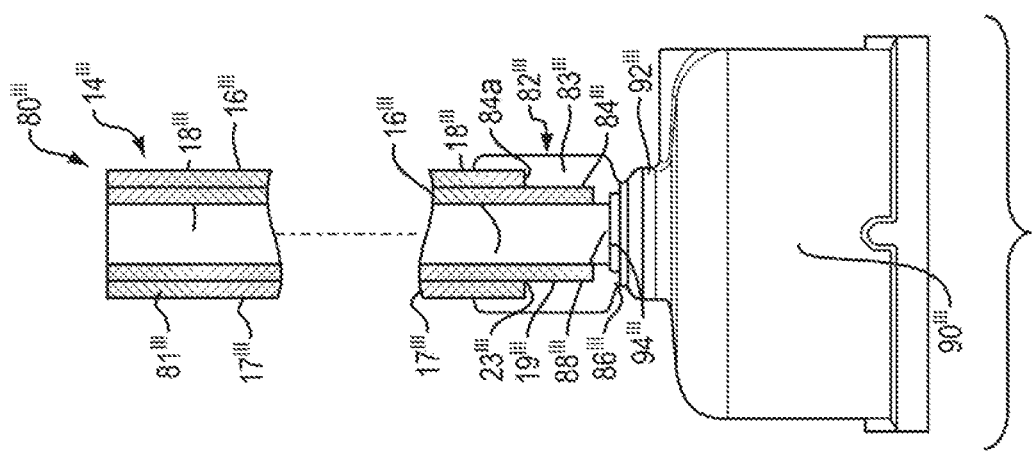
FIG. 15 is a side partial sectional view of a dual-walled reinforced tube/tube connector/filter capsule assembly according to a still further embodiment of the disclosure.

Referring to FIG. 1, in one aspect of the disclosure, a tube/connector assembly shown designated generally as 10 includes a tube designated generally as 14 secured to a tube connector designated generally as 12. Tube 14 has an annular wall 16 that defines a lumen 18. The tube is constructed from a thermoplastic elastomer to take advantage of the multiple advantageous characteristics of this material that impart a combination of flexibility and resiliency. An additional advantage is that the material has no reactivity with respect to most liquids and gases that may be passed through the tube. The tube may or may not include reinforcement materials, e.g., fiberglass or metallic braids, on the exterior or embedded in the material to improve resiliency characteristics and to counter any torsional, compression, tensional and flexion stresses placed on the tubing.

Connector 12 has an annular wall 20 that defines a smooth tube bore 24 dimensioned to receive and register against an outer wall of tube 14. An annular shoulder 22 is formed at a bottom end of bore 24 and extends radially inwardly from an inner surface of connector wall 20 to form a mechanical stop for the tube when inserted into connector 12. A second capsule bore 26 is formed on a bottom end of connector 12 and dimensioned to receive a capsule port or port stem (disclosed in more detail below. Capsule bore 26 is in fluid communication with tube bore 24 and tube lumen 18 when the tube is secured to the connector.

Tube/tube connector assembly 10 is structured to be bonded directly to a capsule port and may be formed in a two-step process whereby the tube and connector are bonded (thermal, sonic and/or solvent bonding) in a one-process step and the tube/tube connector assembly is bonded to the capsule in a second process step (injection molded, insert molded, and/or any of the thermal, sonic and/or solvent bonding methods used to secure the tube to the tube connector). In an alternative embodiment, the tube, tube connector and capsule port are bonded together in a single processing step such as injection molding, whereby the material used to form the tube connector is over-molded onto the capsule port and the tube.

It should be understood that any combination of bonding methods and steps can be used to achieve the final connection-free filter apparatus. For example, both thermal and solvent bonding methods may be used together to secure a soft flexible tube to a rigid plastic connector or filter capsule. It may also be advantageous to use a tube material with a lower melting point than that of the material used to make the relatively rigid plastic connector and/or filter capsule so as not to compromise the integrity of the rigid plastic connector with over-heating. It should be further understood that a soft, flexible tube (made from a thermoplastic elastomer or other pliable material) may be secured directly to a filter capsule using any of the molding/bonding methods disclosed herein.

Tube 14 may be constructed from materials including, but not limited to, thermoplastic elastomers (TPE), thermoplastic rubbers (TPR), silicone, PVC, PVS and the like, and any soft and flexible tubing currently used in the pharmaceutical and medical fields. The connector may be constructed from materials including, but not limited to, polyethylene (PE), polypropylene (PP), high density polyethylene (HDPE), nylon, polyvinylchloride (PVC), polyethylene terephthalate (PET), Hytrel type material, and the like. When materials such as TPE are used for the tubing, simple thermal bonding may be used to secure the tube to a tube connector or directly to the filter capsule. For materials such as PVC for the tubing, solvent bonding may be used to secure the tubing directly to the filter capsule.

Figure 14:
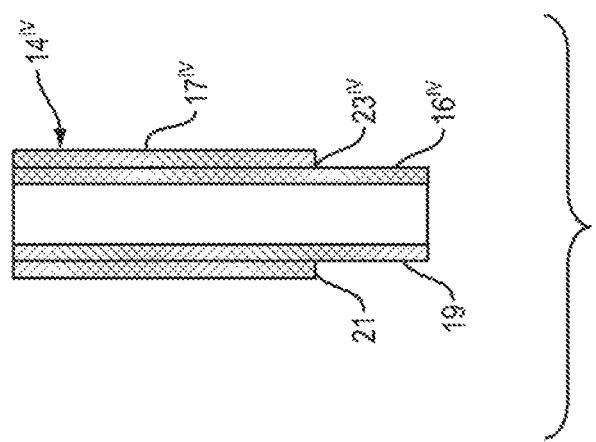
FIG. 14 is a side sectional view of a modified dual-walled reinforced tube according to a further embodiment of the disclosure.
Figure 13:
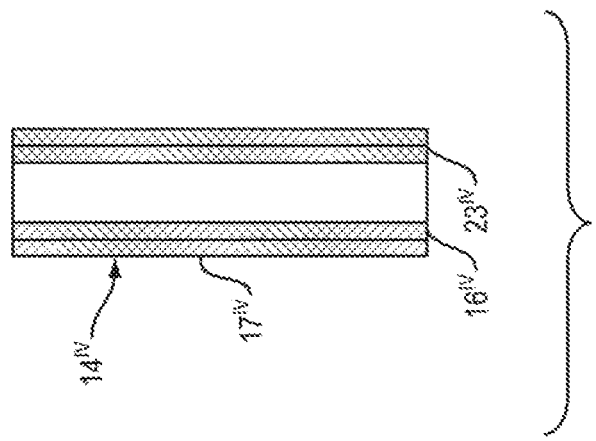
FIG. 13 is a side sectional view of a dual-walled reinforced tube according to another embodiment of the disclosure.

Tube/connector assembly 10 may also be constructed with a dual-walled, reinforced tube such as tube $14^{IV}$ shown in FIGS. 13 and 14, particularly when the tube and larger assembly will be used in a high-pressure system in which higher pressure tolerances are needed in the tube component. From a manufacturing perspective, the primary difference between single and dual-walled tubes is the dimensional considerations of using a tube with a different cross-sectional diameter. Each component is sized to accommodate a different tube diameter including the over-molding material used to form connector 12.

Figure 16:
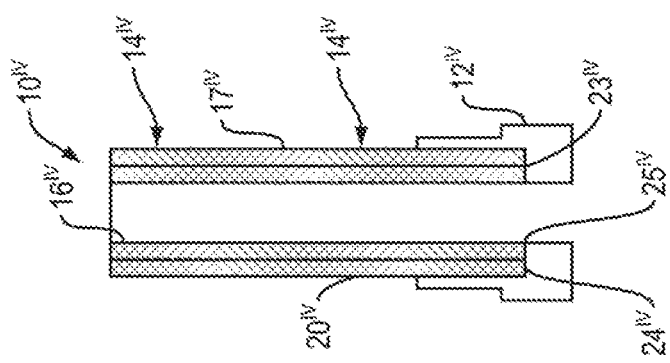
FIG. 16 is a side sectional view of a dual-walled reinforced tube/tube connector subassembly according to yet another embodiment of the disclosure.

Tube $14^{IV}$ may be formed with any of the materials used to form tube 14 as disclosed herein. The tube reinforcement material may be any commonly used in the art to reinforce tubing material including illustratively, and not exhaustively, braided fiberglass, metallic materials, fibrous material such as cotton, and polymer materials such as polyester, nylon, polyethylene, polypropylene and the like. In one embodiment, tube $14^{IV}$ may be secured to tube connector $12^{IV}$, as shown in FIG. 16, with the same methods described for securing tube 14 to connector 12. If secured in the form shown in FIG. 13, the tube end is inserted into tube bore $24^{IV}$ and registered against connector wall $20^{IV}$. FIG. 16 shows tube $14^{IV}$ secured in connector $12^{IV}$. Connector $12^{IV}$ may be pre-formed and subsequently bonded to tube $14^{IV}$ or may be formed in a mold about tube $14^{IV}$ using illustratively, conventional injection molding processes. It should be understood that the same processing options are available to join the tube and connector to a capsule port/port stem as disclosed herein.

If constructed with the dual-wall extending the entire length of the tube as shown in FIG. 16, although a secure bond between the tube and connector may be formed, there is a potential for contamination between the tubes at the dual-tube end junction with the connector (designated gap $23^{IV}$ in FIG. 16), particularly if the reinforcement material superposed about the tubes contributes to the formation of a gap between the tubes. The connector material should flow into the gap during connector formation and seal it off from any liquids or gases introduced to, and/or exiting from, the capsule through the tube. This requires, however, the bulk material of the braided section to have similar properties as the inner tube material and be thermally bonded by the over-molded connector material. If made of material with dissimilar properties, the reinforcement material should be removed before the over-molding process. This will improve the bond and further help prevent the potential release of undesirable extractables from the reinforcement material.

This problem is potentially exacerbated by the relatively small contact surface area $25^{IV}$ between the inner tube $16^{IV}$ end and an annular shoulder $24^{IV}$ of the connector that leaves little room for error in the molding process and is the only bonded section between the tube lumen and gap $23^{IV}$. If there is any failure of the joint, liquids and/or gases can migrate into gap $23^{IV}$, particularly if the system is pressurized. Fluid migrating into the gap under pressure potentially can create tube failure points (tube burst events) in the tubing. Moreover, exposure of the reinforcement material to the fluid may cause product changes on the wetted surfaces of the material that can affect chemical compatibility among the component materials and may negatively impact regulatory compliance if extractables from the reinforcement material leeches into the fluid and into the tube lumen. A modification of tube $14^{IV}$ significantly improves the contact surface area between inner tube $16^{IV}$ and connector $12^{IV}$ and significantly reduces the possibility of fluid migration into gap $23^{IV}$.

Figure 17:
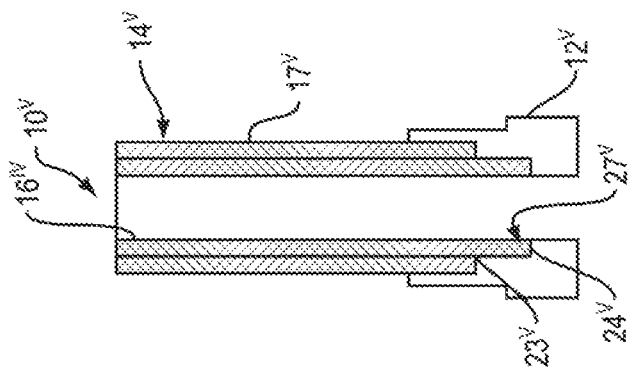
FIG. 17 is a side sectional view of a dual-walled reinforced tube/tube connector subassembly according to still another embodiment of the disclosure.

As shown in FIG. 14, tube $14^{IV}$ may be modified by removing a segment of outer tube $17^{IV}$. This moves gap $23^{IV}$ between the tubes away from the end of inner tube $16^{IV}$ that bonds with an annular shoulder of a connector (shoulder $24^{V}$ shown in FIG. 17). This may or may not include removal of the reinforcement material superposed about inner tube $16^{IV}$ as disclosed above. As shown in FIG. 17, when secured to a connector $12^{V}$, the surface area $27^{V}$ of inner tube $16^{V}$ that contacts connector $12^{V}$ includes the tube end and the outer wall up to the new end of outer tube $17^{V}$. This maximizes the surface area of contact and moves the gap $23^{V}$ between the tubes away from the junction between inner tube $16^{V}$ and shoulder $24^{V}$ of connector $12^{V}$.

To further increase the bond surface area and further eliminate the potential for leakage at the connector/tube junction, any reinforcement material, formed on the exterior of inner tube $16^{V}$, on the inner tube section exposed by the removal of the outer tube segment, may be removed to present a smooth, maximized contact surface to bond to the connector material. This also is particularly warranted if the reinforcement material has chemical and/or processing properties incompatible with the tube material with respect to bonding to the connector material. It should be understood, however, that removal of the reinforcement material is not a mandatory requirement to form a secure bond between the inner tube and connector material. It is an optional measure that can be taken to reduce the probability of bond imperfections and the release of extractables at the connector/tube junction.

Referring now to FIG. 2, in another aspect of the disclosure, a tube/barb connector assembly shown designated generally as 30 includes a tube designated generally as 14 secured to a barb connector designated generally as 32. Like connector 12, barb connector 32 has an annular wall 34 that defines a tube bore dimensioned to receive and register against the outer wall of tube 14. A barb connector shoulder 36 extends radially inwardly from wall 34 to form a stop against which an end of tube 14 registers. A distal end of barb connector 32 is formed as a barb connection 38 with at least one radially extending barb 40. Barb connection 38 defines a barb lumen 42 dimensioned to be substantially similar in dimension to lumen 18 of tube 14.

Tube 14 is secured to barb connector 32 in the same manner disclosed for tube/tube connector assembly 10. The materials used to construct barb connector 32 are the same materials disclosed for tube connector 12. The methods used to secure tube 14 to barb connector 32 are the same as those disclosed for tube/tube connector assembly 10. The barb permits connection to other tubes used to deliver or receive liquids and/or gases depending upon the functional assignment given to the tube/barb connector assembly, i.e., inlet, outlet, vent.

Like tube/tube connector assembly 10, barb connector 32 may be secured to a dual-walled, reinforced tube such as dual-walled tube $14^{IV}$ shown in FIGS. 13 and 14. Again, the primary difference is the dimensional modifications needed to receive a tube with a different cross-sectional diameter. The materials and methods used to secure tube $14^{IV}$ to connector 32, and the considerations that impact such a combination, are the same as those disclosed for the combination of tube $14^{IV}$ with connector $12^{IV}$.

Referring now to FIG. 3, in a further aspect of the disclosure, a tube/tube connector/capsule assembly shown designated generally as 50 includes a tube 14 secured to a tube connector 52 secured to a capsule port 70. Tube 14 and connector 52 are identical in structure, materials and bonding methods to those disclosed for tube/tube connector assembly 10. Tube connector 52 has a wall 51 that defines a tube bore 58 dimensioned to receive and register against the outer surface of tube wall 16. A shoulder 54 that extends radially inwardly from an inner surface of wall 51 functions as a stop and registration surface for tube 14 when the tube is inserted into and bonded to connector 52.

A port channel 68 defined by port 70 and port base 64 is in fluid communication with tube lumen 18 and with the filter chamber defined by capsule 62. The cross-sectional diameter of channel 68 is dimensioned to be substantially the same as, or not less than the cross-sectional diameter of the tube lumen defined by an unstressed, relaxed segment of tube 14. As shown in FIG. 3, capsule 62 represents one end of a complete capsule, the remainder of which is not shown for purposes of simplicity. It should be understood that the remainder of the capsule housing will include additional ports that may be configured with tube/tube connector assemblies.

An annular port channel 56 is formed on a distal end of connector 52 and is dimensioned to receive the annular wall of port 70 such that the inner and outer surfaces of the wall register against the walls of annular bore 56. A top surface of the port wall is further registered against a bottom surface of bore 56 so as to function as a stop and support surface for the joined components.

The materials used to manufacture the tube, tube connector and capsule are the same as those disclosed for tube 14 and tube connector 12 hereinabove. Tube/tube connector/capsule port assembly 50 may be formed in a one-step or two-step process. In the two-step process, the tube and connector are bonded together using thermal, sonic and/or solvent bonding techniques. The tube/tube connector subassembly is then secured in a mold used to make the capsule and is bonded to the capsule port during the capsule molding process. Alternatively, the tube/tube connector subassembly can be bonded to the pre-formed capsule via thermal, sonic and/or solvent bonding.

In the one-step process, the tube, pre-formed tube connector and capsule are bonded together in a single molding step, e.g., insert molding, wherein the tube and pre-formed tube connector are assembled together and placed in the capsule mold prior to the capsule molding process. Alternatively, the three components can be bonded together in a single thermal, sonic and/or solvent bonding method. Either the one-step or two-step processes produce tube/tube connector/capsule port connections that can withstand pressurized applications as well as post-use sterilization procedures using high heat and/or gamma radiation. The tube connector provides the added benefit of rigidifying and strengthening the end of the tube connected to the connector/port combination. This is in contrast to the weakening effect a barb has on the end of a tube connected to the barb.

Like tube/tube connector assembly 10, barb connector 52 may be secured to a dual-walled, reinforced tube such as dual-walled tube $14^{IV}$ shown in FIGS. 13 and 14. The primary difference continues to be the dimensional modifications needed to receive a tube with a different cross-sectional diameter. The materials and methods used to secure tube $14^{IV}$ to connector 52, and the considerations that impact such a combination, are the same as those disclosed for the combination of tube $14^{IV}$ with connector $12^{IV}$.

Referring now to FIG. 4, in a still further aspect of the disclosure, a tube/tube connector/capsule port assembly is shown designated generally as 80. Assembly 80 includes tube 14, a tube connector designated generally as 82 and a capsule designated generally as 90. Connector 82 has the same features and is structured in the same manner as tube connector 12 shown in FIG. 1. Connector 82 has a connector wall 83 that defines a tube bore 88 dimensioned to receive and register against the outer surface of tube wall 16. A shoulder 84 extends radially inwardly from connector wall 83 and forms a stop/registration surface for the end of tube 14. The cross-sectional diameter of bore 88 substantially maintains the cross-sectional diameter of the lumen of tube 14 taken at a relaxed, unstressed portion of the tube.

A bottom end of connector 82 has an annular wall 86 that defines a bore dimensioned to receive the outer wall of capsule port 94. This connector/port connection differs from the connector/port connection shown in FIG. 3 in that connector 82 does not define an annular channel to receive the inner and outer surfaces of the port wall, but just a bore to receive and register against the outer surface of the port wall. This provides a less robust connection, but an adequate one to handle the applications to which the capsule is put to use as well as the post-use sterilization procedures. Like tube/tube connector/capsule port assembly 50, tube/tube connector/capsule port assembly 80 can be constructed from the same materials disclosed for the components of assembly 50 in either a one-step or two-step process such as those disclosed for assembly 50. By way of illustration and not limitation, the tube may be injection molded directly onto the filter capsule.

Like tube/tube connector assembly 10, barb connector 82 may be secured to a dual-walled, reinforced tube such as dual-walled tube $14^{IV}$ shown in FIGS. 13 and 14. The primary difference is the dimensional modifications needed to receive a tube with a different cross-sectional diameter. The materials and methods used to secure tube $14^{IV}$ to connector 82, and the considerations that impact such a combination, are the same as those disclosed for the combination of tube 14$^{IV}$ with connector 12$^{IV}$. FIG. 15 shows a dual-walled tube secured to the filter capsule configuration shown in FIG. 4.

Referring to FIG. 15, in a yet another aspect of the disclosure, a tube/tube connector/capsule port assembly is shown designated generally as 80'''. Assembly 80''' includes dual-walled tube 14''' (with optional reinforcement material 81'''), a tube connector designated generally as 82''' and a capsule designated generally as 90'''. Tube 14''' comprises an inner tube 16''' and an outer tube 17''' superposed about inner tube 16'''. Reinforcement material 81''' is formed about the tubes and creates a gap 23''' between the tubes where the reinforcement material of the respective tubes registers against one another. It should be understood that the optional reinforcement material 81''' may be formed on one or both tubes, or may be imbedded in one or both tubes, as well as configured with any combination of surface mounted and imbedded variations. A segment 19''' of inner tube 16''' is not superposed by outer tube 17'''

Connector 82''' has the same features and is structured in the same manner as tube connector 12 shown in FIG. 1 modified, however, to accommodate a stepped, dual-walled tube. Connector 82''' has a connector wall 83''' that defines a tube bore 88''' dimensioned to receive and register against the outer surface segment 19''' of inner tube wall 16'''. An annular shoulder 84''' extends radially inwardly from connector wall 83''' and forms a stop/registration surface for the end of inner tube 16'''. The cross-sectional diameter of bore 88''' substantially maintains the cross-sectional diameter of the lumen of tube 14''' taken at a relaxed, unstressed portion of the tube. A second annular shoulder 84a extends radially inwardly from connector wall 83''' and forms a stop/registration surface for the end of outer tube 17'''. The bonding surfaces between the tubes, the connector shoulders and the exposed segment 19''' of inner tube 16''' create a significant structural separation of tube gap 23''' from the junction of the end of inner tube 16''' with shoulder 84'''. This effectively eliminates the possibility of fluids in the tube lumen entering the inter-tube gap.

A bottom end of connector 82''' has an annular wall 86''' that defines a bore dimensioned to receive the outer wall of capsule port 94''' and register against port base 92'''. This connector/port connection differs from the connector/port connection shown in FIG. 3 in that connector 82''' does not define an annular channel to receive the inner and outer surfaces of the port wall, but just a bore to receive and register against the outer surface of the port wall. This provides a less robust connection, but an adequate one to handle the applications to which the capsule is put to use as well as the post-use sterilization procedures. Like tube/tube connector/capsule port assembly 50, tube/tube connector/capsule port assembly 80''' can be constructed from the same materials disclosed for the components of assembly 50 in either a one-step or two-step process such as those disclosed for assembly 50. By way of illustration and not limitation, the tube may be injection molded directly onto the preformed filter capsule.

Referring to FIG. 5, in another aspect of the disclosure, a tube/connector assembly shown designated generally as 10' includes a tube designated generally as 14' secured to a tube connector designated generally as 12'. As used herein, elements referenced with primed numbers in one embodiment correspond to elements in other embodiments referenced with the same number either unprimed or primed differently. Tube 14' has an annular wall 16' that defines a lumen 18' like tube 14 disclosed herein.

Connector 12' has an annular wall 20' that defines a tube bore dimensioned to receive and register against an outer wall of tube 14'. A bottom end of the tube bore is formed as an annular tube channel 21 that includes an annular channel bottom 22' that extends radially inwardly from an inner surface of connector wall 20' to form a mechanical stop for the tube when inserted into connector 12'. An inner channel wall designated generally as 24' defines the inner portion of the tube receiving channel and is formed to have a frustoconical profile in cross-section whereby the larger diameter end of the wall, designated 25, extends upwardly toward the tube bore and the smaller diameter end of the inner wall, designated 27, connects to channel bottom 22'. This configuration creates a mechanical restriction surface that mechanically locks tube 14' into the tube channel and bore. When thermal bonding is applied and the tube material is allowed to flow and expand in the channel, the tube is mechanically locked to connector 12' by virtue of the restricting surface of inner channel wall 24'. The cross-sectional diameter of a tube bore 29 defined by an inner surface of inner wall channel 24' may be dimensioned at its most narrow point to be substantially similar to, or essentially not less than the cross-sectional diameter of the tube lumen at a relaxed or unstressed segment of tube 14'.

A second capsule bore 26' is formed on a bottom end of connector 12' and dimensioned to receive a capsule port (disclosed in more detail below. Capsule bore 26' is in fluid communication with a tube bore 29 (defined by an inner surface of channel inner wall 24') and tube lumen 18' when the tube is secured to the connector. Tube/tube connector assembly 10' is structured to be bonded directly to a capsule port and is formed in a two-step process whereby the tube and connector are bonded in one process step and the tube/tube connector assembly is bonded to the capsule in a second process step. In an alternative embodiment, the tube, tube connector and capsule port are bonded together in a single processing step when the capsule is molded as disclosed more fully herein.

Tube 14' may be constructed from same materials disclosed for tube 14. Tube connector 12' may be constructed from the same materials disclosed for tube connector 12.

Like tube/tube connector assembly 10, barb connector 12' may be secured to a dual-walled, reinforced tube such as dual-walled tube 14$^{IV}$ shown in FIGS. 13 and 14. The primary difference is the dimensional modifications needed to receive a tube with a different cross-sectional diameter. The materials and methods used to secure tube 14$^{IV}$ to connector 12', and the considerations that impact such a combination, are the same as those disclosed for the combination of tube 14$^{IV}$ with connector 12$^{IV}$.

Referring now to FIG. 6, in another aspect of the disclosure, a tube/barb connector assembly shown designated generally as 30' includes a tube designated generally as 14' secured to a barb connector designated generally as 32'. Like connector 12', barb connector 32' has an annular wall 34' that defines a tube bore dimensioned to receive and register against the outer wall of tube 14'. A bottom end of the tube bore is formed as an annular channel, designated generally as 37, and is similar in construction and function to channel 24' of connector 12' in that it has an inner channel wall having a frustoconical shape in cross-section that creates a restriction surface to mechanically lock tube 14' to the connector when bonded to the connector.

A distal end of barb connector 32' is formed as a barb connection 38' with at least one radially extending barb 40'.

Barb connection 38' defines a barb lumen 42' that may be dimensioned to be substantially similar in dimension to lumen 18' of tube 14'.

Tube 14' is secured to barb connector 32' in the same manner disclosed for tube/tube connector assembly 10. The materials used to construct barb connector 32' are the same materials disclosed for tube connector 12. The methods used to secure tube 14' to barb connector 32' are the same as those disclosed for tube/tube connector assembly 10. The barb permits connection to other tubes used to deliver or receive liquids and/or gases depending upon the functional assignment given to the tube/barb connector assembly, i.e., inlet, outlet, vent.

Like tube/tube connector assembly 10, barb connector 32' may be secured to a dual-walled, reinforced tube such as dual-walled tube $14^{IV}$ shown in FIGS. 13 and 14. The primary difference is the dimensional modifications needed to receive a tube with a different cross-sectional diameter. The materials and methods used to secure tube $14^{IV}$ to connector 32', and the considerations that impact such a combination, are the same as those disclosed for the combination of tube $14^{IV}$ with connector $12^{IV}$.

Referring now to FIG. 7, in a further aspect of the disclosure, a tube/tube connector/capsule assembly shown designated generally as 50' includes a tube 14' secured to a tube connector 52' secured to a capsule port 70'. Tube 14' and connector 52' are identical in structure, materials and bonding methods to those disclosed for tube/tube connector assembly 10'. Tube connector 52' has a wall 51' that defines a tube bore 58' dimensioned to receive and register against the outer surface of tube wall 16'. A bottom end of the tube bore is formed as an annular channel, designated generally as 57, and is similar in construction and function to channel 24' of connector 12' in that it has an inner channel wall having a frustoconical shape in cross-section that creates a restriction surface to mechanically lock tube 14' to the connector when bonded to the connector. The bottom surface of channel 24' functions as a stop and registration surface for tube 14' when the tube is inserted into and bonded to connector 52'.

A port channel 68' defined by port 70' and a port base 64' is in fluid communication with tube lumen 18' and with the filter chamber defined by capsule 62'. The cross-sectional diameter of channel 68' is dimensioned to be substantially the same as, or not less than the cross-sectional diameter of the tube lumen defined by an unstressed, relaxed segment of tube 14'. As shown in FIG. 7, capsule 62' represents one end of a complete capsule, the remainder of which is not shown for purposes of simplicity. It should be understood that the remainder of the capsule housing will include additional ports that may be configured with tube/tube connector assemblies.

An annular port channel 56 is formed on a distal end of connector 52' and is dimensioned to receive the annular wall of port 70' such that the inner and outer surfaces of the wall register against the walls of annular bore 56'. A top surface of the port wall is further registered against a bottom surface of bore 56' so as to function as a stop and support/registration surface for the joined components.

The materials used to manufacture the tube, tube connector and capsule are the same as those disclosed for tube 14, tube connector 12 and capsule 62 hereinabove. Tube/tube connector/capsule port assembly 50' may be formed in a one-step or two-step process such as those described for assembly 50 herein.

Like tube/tube connector assembly 10, barb connector 52' may be secured to a dual-walled, reinforced tube such as dual-walled tube $14^{IV}$ shown in FIGS. 13 and 14. The primary difference is the dimensional modifications needed to receive a tube with a different cross-sectional diameter. The materials and methods used to secure tube $14^{IV}$ to connector 52', and the considerations that impact such a combination, are the same as those disclosed for the combination of tube $14^{IV}$ with connector $12^{IV}$.

Referring now to FIG. 8, in a still further aspect of the disclosure, a tube/tube connector/capsule port assembly is shown designated generally as 80'. Assembly 80' includes tube 14', a tube connector designated generally as 82' and a capsule designated generally as 90'. Connector 82' has the same features and is structured in the same manner as tube connector 12' shown in FIG. 5. Connector 82' has a connector wall 83' that defines a tube bore 88' and is dimensioned to receive and register against the outer surface of tube wall 16'. A bottom end of tube bore 88' is formed as an annular channel, designated generally as 89, and is similar in construction and function to channel 24' of connector 12' in that it has an inner channel wall having a frustoconical shape in cross-section that creates a restriction surface to mechanically lock tube 14' to the connector when bonded to the connector. The bottom surface 87 of channel 89 functions as a stop and registration surface for and end of tube 14' when the tube is inserted into and bonded to connector 82'.

An inner annular surface of the inner wall of annular channel 89 defines a connector channel 91 in fluid communication with a port channel defined by port wall 94' and port base 92' as well of the chamber defined by capsule 90'. The cross-sectional diameter of the narrowest portion of connector channel 91 may be substantially the same as, or not substantially less than the cross-sectional diameter of the lumen of tube 14' taken at a relaxed, unstressed portion of the tube.

A bottom end of connector 82' has an annular wall 86' that defines a bore dimensioned to receive the outer wall of capsule port 94'. This connector/port connection differs from the connector/port connection shown in FIG. 7 in that connector 82' does not define an annular channel to receive the inner and outer surfaces of the port wall, but just a bore to receive and register against the outer surface of the port wall. This provides a less robust connection, but an adequate one to handle the applications to which the capsule is put to use as well as the post-use sterilization procedures. Like tube/tube connector/capsule port assembly 50', tube/tube connector/capsule port assembly 80' can be constructed from the same materials disclosed for the components of assembly 50 in either a one-step or two-step process such as those disclosed for assembly 50.

Like tube/tube connector assembly 10, barb connector 82' may be secured to a dual-walled, reinforced tube such as dual-walled tube $14^{IV}$ shown in FIGS. 13 and 14. The primary difference is the dimensional modifications needed to receive a tube with a different cross-sectional diameter. The materials and methods used to secure tube $14^{IV}$ to connector 82', and the considerations that impact such a combination, are the same as those disclosed for the combination of tube $14^{IV}$ with connector $12^{IV}$.

Referring to FIG. 9, in one aspect of the disclosure, a tube/connector assembly shown designated generally as 10" includes a tube designated generally as 14" secured to a tube connector designated generally as 12". Tube 14" has an annular wall 16" that defines a lumen 18" like tube 14 disclosed herein.

Connector 12" has an annular wall 19 that defines a tube channel designated generally as 20" dimensioned to receive and register against the inner and outer walls of tube 14".

Tube channel 20" comprises a channel outer wall 21", an annular channel bottom 22" and a channel inner wall 23". Annular channel bottom 22" forms a mechanical stop for the tube end when inserted into connector 12". This configuration creates a tube rigidifying structure that mechanically enhances the segment of the tube secured in the channel. When thermal bonding is applied and the tube material is allowed to flow and expand in the channel, the tube is radially restricted by the walls of the channel to maintain the cross-sectional dimensional integrity of tube 14". The cross-sectional diameter of a tube bore 25 defined by an inner surface of inner wall channel 23" may be dimensioned to be substantially similar to, or essentially not less than the cross-sectional diameter of the lumen of a relaxed or unstressed segment of tube 14".

A second capsule bore 26" is formed on a bottom end of connector 12" and dimensioned to receive a capsule port (disclosed in more detail below. Capsule bore 26" is in fluid communication with tube bore 25 (defined by an inner surface of channel inner wall 23") and tube lumen 18" when the tube is secured to the connector. Tube/tube connector assembly 10" is structured to be bonded directly to a capsule port and is formed in a two-step process like assembly 10 whereby the tube and connector are bonded in one process step and the tube/tube connector assembly is bonded to the capsule in a second process step. In an alternative embodiment, the tube, tube connector and capsule port are bonded together in a single processing step when the capsule is molded as disclosed more fully herein.

Tube 14" may be constructed from same materials disclosed for tube 14. Tube connector 12" may be constructed from the same materials disclosed for tube connector 12.

Like tube/tube connector assembly 10, barb connector 12" may be secured to a dual-walled, reinforced tube such as dual-walled tube $14^{IV}$ shown in FIGS. 13 and 14. The primary difference is the dimensional modifications needed to receive a tube with a different cross-sectional diameter. The materials and methods used to secure tube $14^{IV}$ to connector 12", and the considerations that impact such a combination, are the same as those disclosed for the combination of tube $14^{IV}$ with connector $12^{IV}$.

Referring now to FIG. 10, in another aspect of the disclosure, a tube/barb connector assembly shown designated generally as 30" includes a tube designated generally as 14" secured to a barb connector designated generally as 32". Like connector 12", barb connector 32" has an annular wall 33 that defines a tube channel designated generally as 35 dimensioned to receive and register against the inner and outer walls of tube 14". Tube channel 35 comprises a channel outer wall 36, an annular channel bottom 38 and a channel inner wall 37. Annular channel bottom 38 forms a mechanical stop for the tube end when inserted into connector 32". Again, this configuration creates a tube rigidifying structure that mechanically enhances the segment of the tube secured in the channel.

When thermal bonding is applied and the tube material is allowed to flow and expand in the channel, the tube is radially restricted by the walls of the channel to maintain the cross-sectional dimensional integrity of tube 14". The cross-sectional diameter of a tube bore 34 defined by an inner surface of inner wall channel 37 may be dimensioned to be substantially similar to, or essentially not less than the cross-sectional diameter of the tube lumen at a relaxed or unstressed segment of tube 14".

A distal end of barb connector 32" is formed as a barb connection 39 with at least one radially extending barb 40". Barb connection 39 defines a barb lumen 42" that may have a cross-sectional diameter substantially similar to the cross-sectional diameter of lumen 18" at a relaxed or unstressed portion of tube 14".

Tube 14" is secured to barb connector 32" in the same manner disclosed for tube/tube connector assembly 10. The materials used to construct barb connector 32" are the same materials disclosed for tube connector 12. The methods used to secure tube 14" to barb connector 32" are the same as those disclosed for tube/tube connector assembly 10. The barb permits connection to other tubes used to deliver or receive liquids and/or gases depending upon the functional assignment given to the tube/barb connector assembly, i.e., inlet, outlet, vent.

Like tube/tube connector assembly 10, barb connector 32" may be secured to a dual-walled, reinforced tube such as dual-walled tube $14^{IV}$ shown in FIGS. 13 and 14. The primary difference is the dimensional modifications needed to receive a tube with a different cross-sectional diameter. The materials and methods used to secure tube $14^{IV}$ to connector 32", and the considerations that impact such a combination, are the same as those disclosed for the combination of tube $14^{IV}$ with connector $12^{IV}$.

Referring now to FIG. 11, in a further aspect of the disclosure, a tube/tube connector/capsule assembly shown designated generally as 50" includes a tube 14" secured to a tube connector 52" secured to a capsule port 70". Tube 14" and connector 52" are identical in structure, materials and bonding methods to those disclosed for tube/tube connector assembly 10". Tube connector 52" has an annular wall 54 that defines an annular tube channel designated generally as 55 dimensioned to receive and register against the inner and outer walls of tube 14". Tube channel 55 comprises a channel outer wall 56, an annular channel bottom 57 and a channel inner wall 58. Annular channel bottom 57 forms a mechanical stop and registration surface for the tube end when inserted into, and bonded to, connector 52".

Like the similar structures disclosed herein for assembly 10", this configuration creates a tube rigidifying structure that mechanically enhances the segment of the tube secured in the channel. When thermal bonding is applied and the tube material is allowed to flow and expand in the channel, the tube is radially restricted by the walls of the channel to maintain the cross-sectional dimensional integrity of tube 14". The cross-sectional diameter of a tube bore 59 defined by an inner surface of inner wall channel 58 may be dimensioned to be substantially similar to, or essentially not less than the cross-sectional diameter of the tube lumen at a relaxed or unstressed segment of tube 14".

A port channel 68" defined by port 70" and a port base 64" is in fluid communication with tube lumen 18" and with the filter chamber defined by capsule 62". The cross-sectional diameter of channel 68" may be dimensioned to be substantially the same as, or not less than the cross-sectional diameter of tube lumen 18" defined at an unstressed, relaxed segment of tube 14'. As shown in FIG. 11, capsule 62" represents one end of a complete capsule, the remainder of which is not shown for purposes of simplicity. It should be understood that the remainder of the capsule housing will include additional ports that may be configured with tube/tube connector assemblies.

An annular port bore 61 is formed on a distal end of connector 52" and is dimensioned to receive the annular wall of port 70" such that the inner and outer surfaces of the wall register against the walls of port bore 61. A top surface of the port wall is further registered against a bottom surface of bore 61 so as to function as a stop and support/registration surface for the joined components.

The materials used to manufacture the tube/tube connector/capsule assembly 50" are the same as those disclosed for tube 14, tube connector 12 and capsule 62 hereinabove. Assembly 50' may be formed in a one-step or two-step process such as those described for assembly 50 herein.

Like tube/tube connector assembly 10, barb connector 52" may be secured to a dual-walled, reinforced tube such as dual-walled tube 14$^{IV}$ shown in FIGS. 13 and 14. The primary difference is the dimensional modifications needed to receive a tube with a different cross-sectional diameter. The materials and methods used to secure tube 14$^{IV}$ to connector 52", and the considerations that impact such a combination, are the same as those disclosed for the combination of tube 14$^{IV}$ with connector 12$^{IV}$.

Referring now to FIG. 12, in a still further aspect of the disclosure, a tube/tube connector/capsule port assembly is shown designated generally as 80". Assembly 80" includes tube 14", a tube connector designated generally as 82" and a capsule designated generally as 90". Connector 82" has the same features and is structured in the same manner as tube connector 12" shown in FIG. 9.

Connector 82' has a connector wall 83' that an annular tube channel designated generally as 85 dimensioned to receive and register against the inner and outer walls of tube 14". Tube channel 85 comprises a channel outer wall 86, an annular channel bottom 87 and a channel inner wall 88. Annular channel bottom 87 forms a mechanical stop and registration surface for the tube end when inserted into, and bonded to, connector 82". Like the similar structures disclosed herein for assembly 10", this configuration creates a tube rigidifying structure that mechanically enhances the segment of the tube secured in the channel. When thermal bonding is applied and the tube material is allowed to flow and expand in the channel, the tube is radially restricted by the walls of the channel to maintain the cross-sectional dimensional integrity of tube 14". The cross-sectional diameter of a tube bore 89 defined by an inner surface of inner wall channel 88 may be dimensioned to be substantially similar to, or essentially not less than the cross-sectional diameter of the tube lumen at a relaxed or unstressed segment of tube 14".

A bottom end of connector 82" has an annular wall 83 that defines a bore dimensioned to receive the outer wall of capsule port 94". This connector/port connection differs from the connector/port connection shown in FIG. 11 in that connector 82" does not define an annular channel to receive the inner and outer surfaces of the port wall, but just a bore to receive and register against the outer surface of the port wall. This provides a less robust connection, but an adequate one to handle the applications to which the capsule is put to use as well as the post-use sterilization procedures. Like tube/tube connector/capsule port assembly 50", tube/tube connector/capsule port assembly 80" can be constructed from the same materials disclosed for the components of assembly 50 in either a one-step or two-step process such as those disclosed for assembly 50.

Like tube/tube connector assembly 10, barb connector 82" may be secured to a dual-walled, reinforced tube such as dual-walled tube 14$^{IV}$ shown in FIGS. 13 and 14. The primary difference is the dimensional modifications needed to receive a tube with a different cross-sectional diameter. The materials and methods used to secure tube 14$^{IV}$ to connector 82", and the considerations that impact such a combination, are the same as those disclosed for the combination of tube 14$^{IV}$ with connector 12$^{IV}$.

Figure 19:
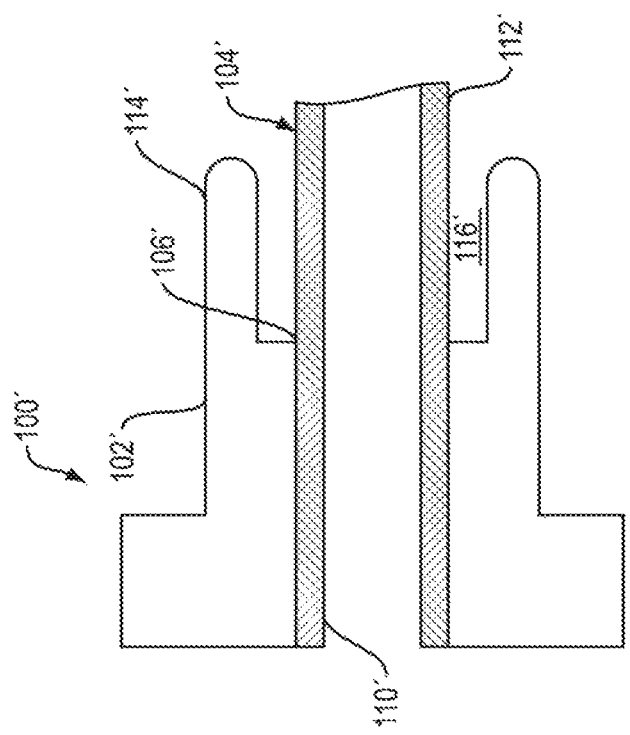
FIG. 19 is a side sectional view of a single-walled tube/tube connector subassembly with a reinforcement collar according to another embodiment of the disclosure.
Figure 18:
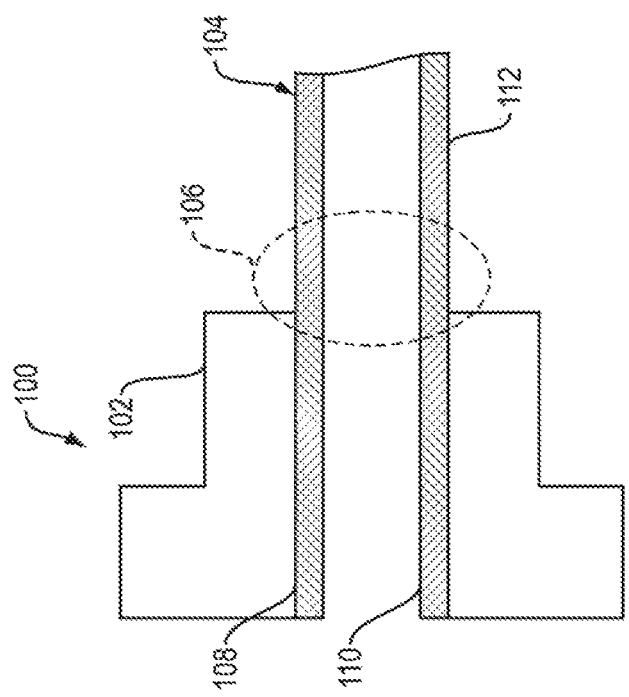
FIG. 18 is a side sectional view of a single-walled tube/tube connector subassembly according to a further embodiment of the disclosure.

Referring now to FIGS. 18 and 19, in another aspect of the disclosure, a connector modification is formed to provide stress relief to the connector/tube junction. As shown in the figures, a connector/tube assembly shown designated generally as 100 includes a connector 102 secured about a tube 104. As highlighted in FIG. 18, the connector/tube junction 106 creates a weak zone where the support of connector 102 ends. This is a flexion point with the connector functioning as an anchor 108 to the supported segment of the tube 110 against which the unsupported segment of the tube 112 particularly as the junction, can bend and become weakened.

To limit the degree of flexion, as shown in FIG. 18, a modified connector/tube assembly designated generally as 100' has the same basic features as assembly 100. A connector 102' is secured to a segment 110' of a tube 104'. A flexion zone is formed at the connector/tube junction 106'. This leaves an unsupported tube segment 112'. To support the flexion zone, an annular tube support collar 114' is formed extending from the peripheral end of connector 102'. The gap 116' between collar 114' and tube 104' permits some flexion and range of motion for the tube to accommodate any need to direct the tube away from a perpendicular orientation to the connector when connected to a larger assembly (not shown). The length of support collar 114' can be adjusted to increase or decrease the range of tube flexion permitted. A shorter collar will permit a greater range of flexion while a longer collar will permit a relatively shorter range of tube flexion. Optionally, an additional ring (not shown) may be formed about the collar from reinforcing material, e.g., metal, to provide additional rigidity, if needed.

Referring now to FIGS. 20-36, in a further aspect of the disclosure, a tube/tube connector/capsule assembly train shown designated generally as 120 includes a series of capsule assemblies 122 (two shown in FIG. 20), connected by lengths of tube 126. As used herein, a tube/tube connector/capsule assembly train defines the combination of a plurality of capsule assemblies connected together with tubing material. As further used herein, capsule assembly defines a combination of a capsule with at least one port with a dedicated tube connector secured to the port. Capsule assemblies may also define a capsule with two or more ports with at least one of the ports having a dedicated tube connector.

The capsule assembly-tube combination permits multiple capsule assemblies to be attached in a single train. Each capsule assembly in the train may have one or multiple filters or filter media that differ from the other connected capsule assemblies to impart different or sequentially refined filtering functions. Illustratively, each successive downstream capsule assembly may be constructed with membranous filter media that each have successively smaller pore sizes and/or more dense porosities to capture smaller particles in the liquid being filtered. The successive capsule assemblies may also be constructed with filters or filter media having different surface energies, (hydrophobic versus hydrophilic), or structured to filter out different materials, e.g., oils with a filter having oleophobic properties. The combinations are significantly numerous in terms of variability and adjustability to accommodate a wide range of filtering applications.

For ports situated at the ends of the filter trains, the ports may be configured with a tube connector, or adapted to connect to larger assemblies with different styled connectors. Capsule assemblies 122 are arranged to receive unidirectional flow, i.e., the outlet port of the first capsule assembly in the train is connected to the inlet port of the capsule assembly immediately downstream. The same orientation is used with each subsequent capsule assembly. It should be understood that the direction of flow can be reversible with each outlet port being reassigned as an inlet and each inlet port being reassigned as an outlet.

As with previously described aspects of the disclosure, the capsule assemblies are assembled with tube connectors and tubes to eliminate connection points for the reasons disclosed herein. Unlike the prior disclosed aspects of the disclosure, the assemblies shown in FIGS. 20-36 use port/tube connector combinations that have tube reception channels formed by the combination of the tube connectors and ports in which the tubes register against and between portions of the ports and portions of the tube connector. The prior aspects of the disclosure involve tube reception channels formed solely in the tube connectors.

For each capsule port for which a connection-free connector is desired, a dedicated tube connector is secured to each of the selected ports, which, in combination with the port, is constructed to receive a tube end. Port/tube connector combinations are disclosed herein that provide divergent, non-constricting or constricting tube connection pathways; convergent, non-constricting or constricting tube connection pathways; and/or linear, constricting tube connection pathways to secure tubes to the connection assemblies. Each embodiment is structured to maintain the cross-sectional diameter of the flow path, defined by an unstressed, unobstructed portion of the tube, throughout the connection point.

Figure 20:
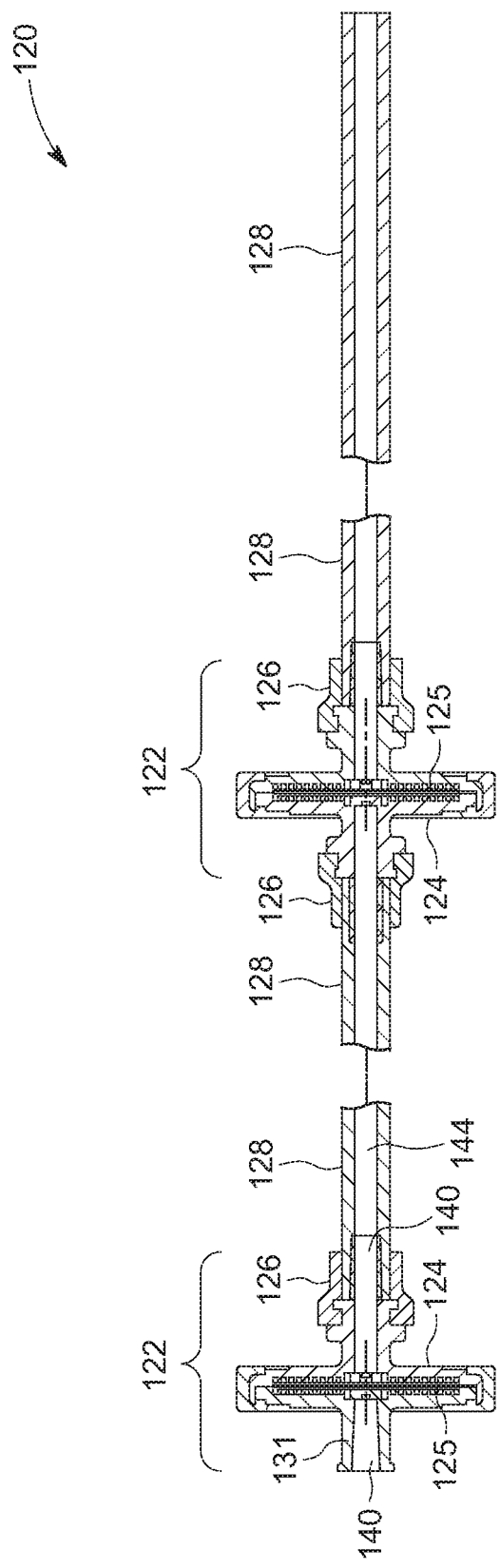
FIG. 20 is a side sectional, partial fragmented, view of a filter train having a plurality of tube-connected, single-walled tube/tube connector/capsule assemblies according to a further embodiment of the disclosure.
Figure 21:
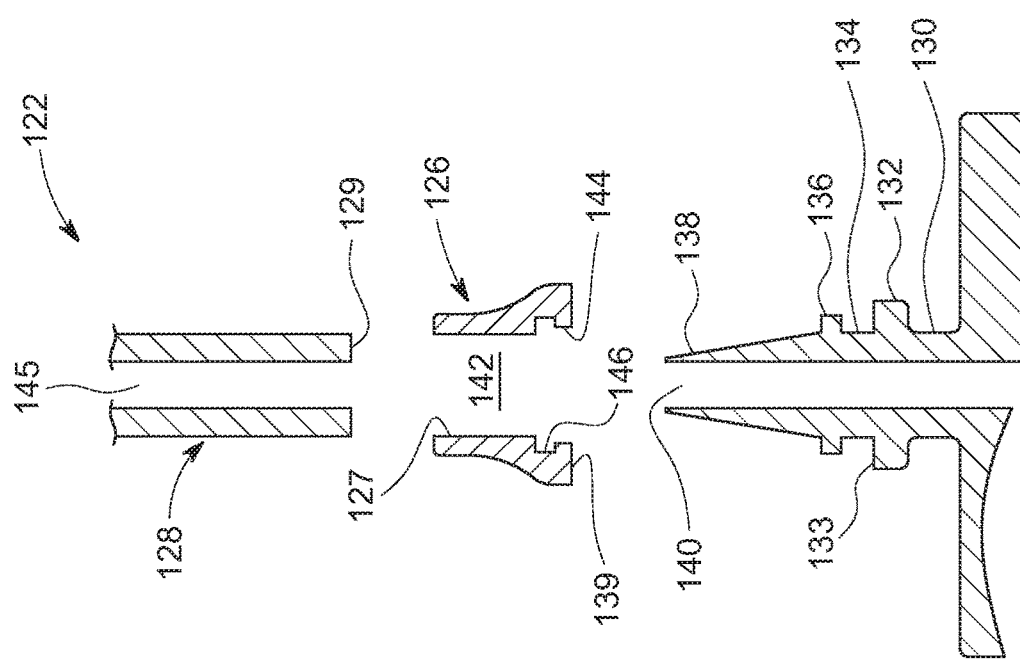
FIG. 21 is a side sectional exploded view of a tube/tube connector/capsule assembly according to the embodiment shown in FIG. 20.
Figure 23:
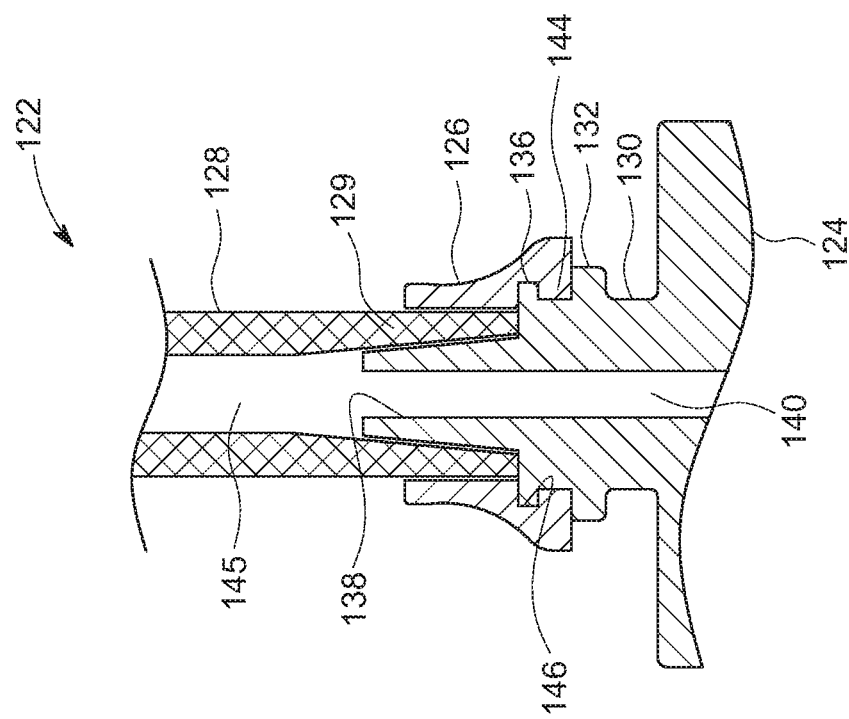
FIG. 23 is a side sectional view of the tube/tube connector/capsule assembly shown in FIG. 21.

More particularly, as shown in FIGS. 20, 21 and 23, a capsule assembly designated generally as 122 includes a capsule, shown generally as 124, that defines a filter chamber in which a filter 125 is secured. An inlet port 131 structured to connect to a larger assembly via a tri-clamp or the connection means known in the art extends from an upstream end of the capsule 124 and defines a port in fluid communication with the filter chamber.

To form a connection-free junction between capsule 124 and a tube, a modified port 130, which can be either an inlet port or an outlet port, is formed with a first annular flange 132 that extends radially outwardly from the port wall to form a registration surface for tube connector 126. A top annular surface 133 of flange 132 functions as a registration surface for tube connector 126. A second annular flange 136 is formed about port 130 and extends radially outwardly from the port wall. Second annular flange 136 is formed at a point on port 130 more distal from the base of the port than first annular flange 132. The radial length of second annular flange 136 is less than the radial length of first annular flange 132. The combination of first annular flange 132 and second annular flange 136 forms an annular port channel 134 that permits the formation of a mechanical lock between the port and the tube connector as disclosed in more detail below.

A conical port tip 138 extends beyond second annular flange 136 and defines a tapered profile in cross section with the smaller diameter of the taper being formed at the end most distal from the second annular flange. Port 130 defines a port channel 140 that extends the length of the port and remains essentially uniform in cross section along the length of the port. Port channel 140 is in fluid communication with the capsule filter chamber.

A tube connector, shown generally as 126, defines a connector through-bore 142 defined by a connector inner wall 127. In this embodiment, connector through-bore 142 is uniform in cross section along its length, i.e., substantially cylindrical. A connector bottom surface 139 is constructed to register against top surface 133 of first annular flange 132. A bottom end of tube connector 126 is formed with an annular wall 144 recessed from inner wall 127 and dimensioned to fit within, and register against, bottom annular port channel 134. The cross-sectional diameter of the channel formed by recessed annular wall 144 is greater than the cross-sectional diameter of inner wall 127. Tube connector 126 may be substantially rigid or semi-rigid with some flexion.

An annular tube connector channel 146 is formed proximal to recessed annular wall 144 and is dimensioned to receive and register against second annular flange 136. The segment of tube connector 126 in the region of channel 146 and annular wall 144 may have an outer cross-sectional diameter greater than the outer cross-sectional diameter of the remainder of the tube connector to provide sufficient tube connector material to create a robust connection between the tube connector and the port that can withstand the mechanical stresses placed upon the connector when connected to port 130. The combination of the two annular flanges of port 130 and the features of tube connector channel 146 that register against the port flanges create a mechanical lock between the port and the tube connector.

Figure 25:
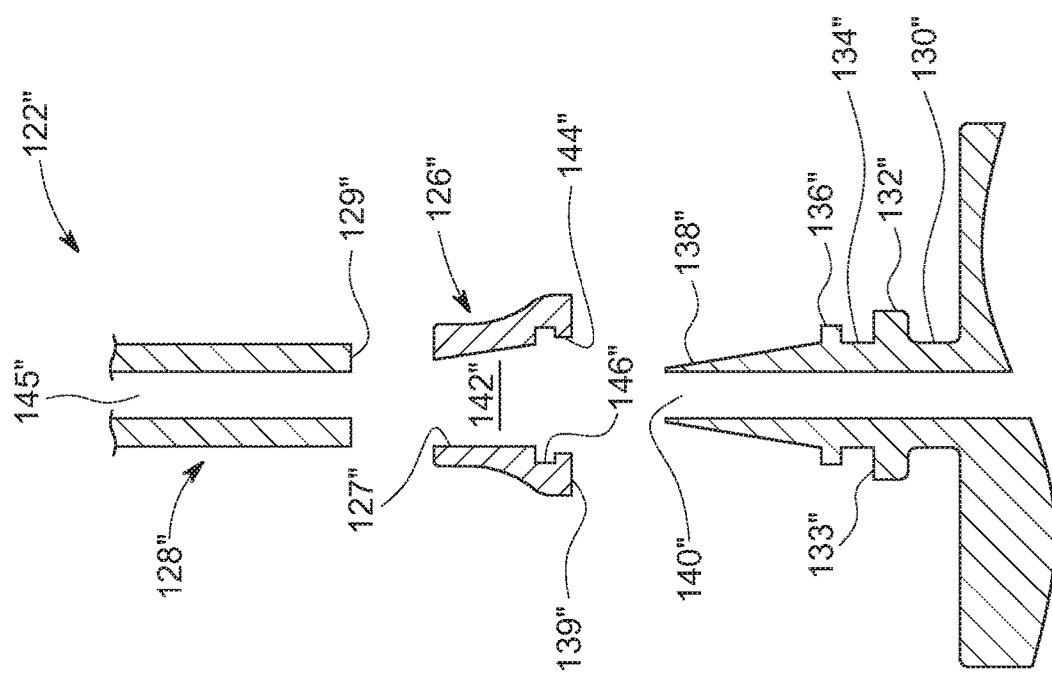
FIG. 25 is a side sectional exploded view of a tube/tube connector/capsule assembly according to a further embodiment of the disclosure.

When tube connector 126 is secured to port 130, an annular conically-shaped, tube-receiving gap, (tapered in cross-section) is formed between an outer surface of port tip 138 and connector inner wall 127 as shown in FIG. 25. The end of port tip 138 may be radiused or chamfered to provide a smooth registration surface for the tube so as not to cause damage to the tube when urged over port tip 138. The smaller end of the tapered annular gap is formed proximal to second annular flange 136. The cross-sectional diameter of the small end is dimensioned to be less than the cross-sectional thickness of the wall of a tube, shown generally as 128. This causes the tube wall at a tube end 129 to be compressed when inserted into the gap. The further the tube is inserted into the gap, the more the compression forces increase to secure the tube in the gap until the bottom of the gap is reached. It should be understood that insertion to the bottom of the gap is not required if sufficient compression is provided against the tube wall before the tube end reaches the bottom of the gap. In this regard, tube end 129 may or may not register against a top surface of second annular flange 136.

With respect to the use of compression forces to secure tube 126, additional or alternative means also may be used to secure the tube to the tube connector/port combination including adhesives, friction fit surfaces and mechanical interlocking features. Some chemical or mechanical adhesion between the tube and tube connector/port combination may also occur if the connection is formed in a one-step molding process whereby the tube connector is formed around a pre-assembled combination of a pre-formed port and a pre-formed tube with tube end 129 secured over port tip 138. The preassembled components are placed in a mold for compression or injection molding of the tube connector. Tube connector 126 may also be thermoformed about the tube and port combination.

If each piece is formed separately from the others before assembly, tube connector 126 is formed from materials that have sufficient elastic properties to permit tube connector 126 to be urged over tube end 129 and port tip 130. In such an embodiment, the tube connector can be assembled initially to the port tip by urging tube connector 126 over port tip 130 until tube connector channel 146 is positioned over and against second annular flange 136. Tube end 129 is then urged into the gap formed by the port/tube connector combination.

Alternatively, tube connector 126 can be pre-assembled to tube 128 with tube end 129 inserted into tube connector channel 142, the combination of which is then urged over port tip 138 with the port tip inserted into tube channel 145 until second annular flange 136 is registered against, and inside, tube connector channel 146. It should be understood that any method used to assemble the port/tube connector/tube combination is within the scope and spirit of the disclosure.

Once assembled, a tube channel 145 defined by tube 128 is in fluid communication with port channel 140. The cross-sectional diameter of port channel 140 may be set to equal the cross-sectional diameter of a relaxed, unstretched, uncompressed and unobstructed section of tube 128. The mechanical interlocking features of port 130 and tube connector 126 along with the tube receiving features of the port/tube connector combination provide a robust, substantially air-tight and fluid-tight seal between the port/tube connector combination and the attached tube.

The port/tube connector combination shown in FIGS. 21 and 23 represents a linear, constricting tube embodiment in that one of the tube registration surfaces of the port tip and/or tube connector is substantially parallel with a longitudinal axis of the tube. In the case of the embodiment shown in FIGS. 21 and 23, connector inner wall 127 is substantially parallel with the tube connector's longitudinal axis. The tapered outer surface of port tip 138 in cross-section in combination with inner wall 127 creates a structural constriction feature that constricts the wall of tube 128.

Figure 22:
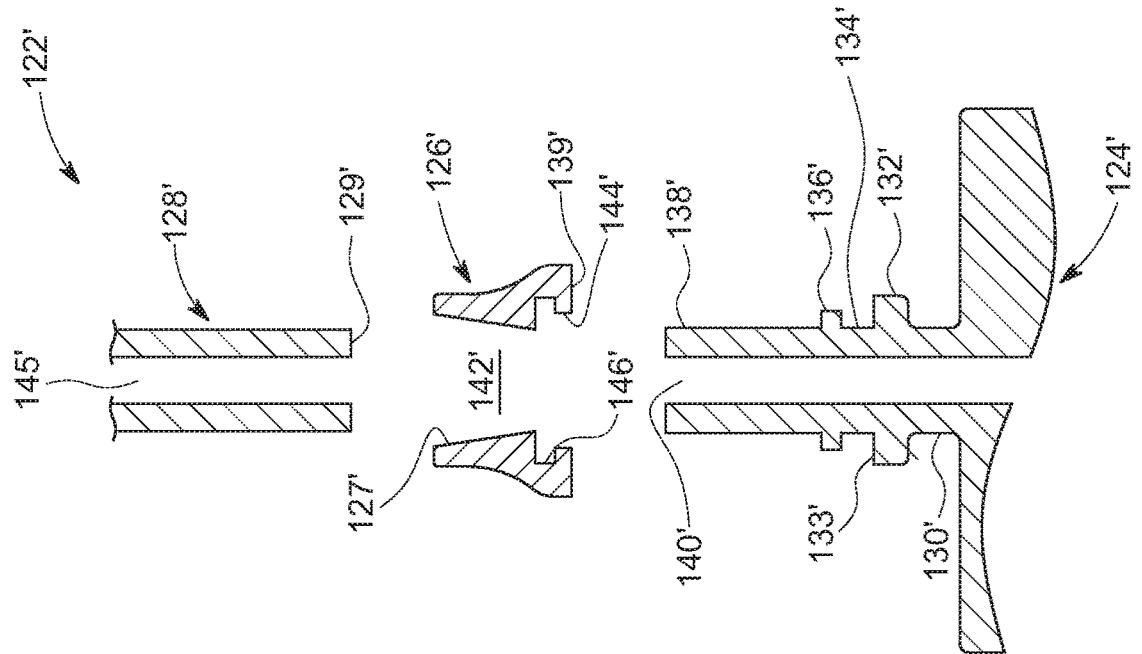
FIG. 22 is a side sectional exploded view of a tube/tube connector/capsule assembly according to another embodiment of the disclosure.
Figure 24:
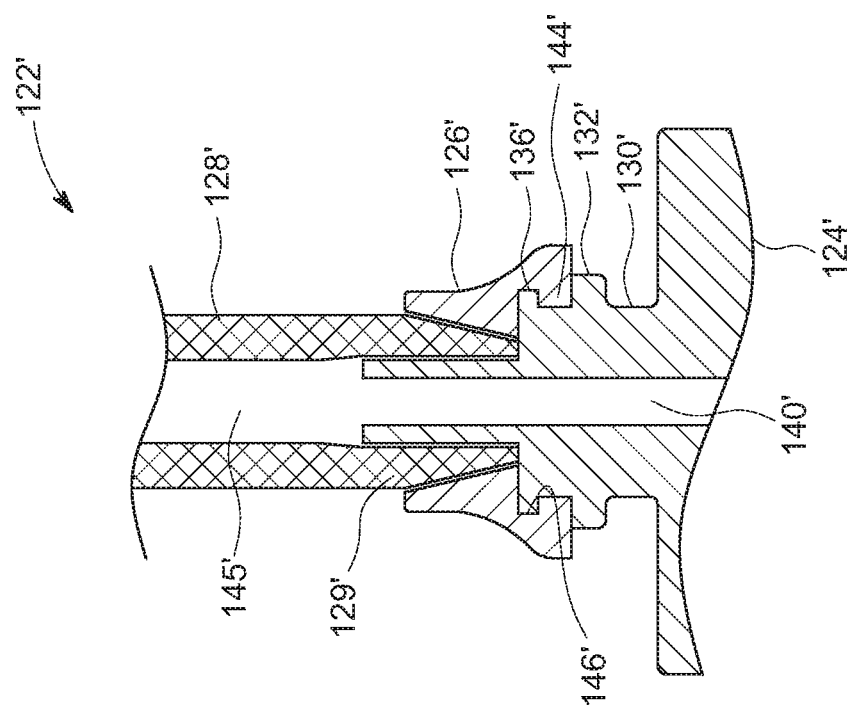
FIG. 24 is a side sectional view of the tube/tube connector/capsule assembly shown in FIG. 22.

In an alternate embodiment shown in FIGS. 22 and 24, a capsule assembly designated generally as 122' includes a capsule, shown generally as 124'. To form a connection-free junction between capsule 124' and a tube, a modified port 130', which can be either an inlet port or an outlet port, is formed with a first annular flange 132' that extends radially outwardly from the port wall to form a registration surface for a tube connector 126'. A top annular surface 133' of flange 132' functions as a registration surface for tube connector 126'. A second annular flange 136' is formed about port 130' and extends radially outwardly from the port wall. Second annular flange 136' is formed at a point on port 130' more distal from the base of the port than first annular flange 132'. The radial length of second annular flange 136' is less than the radial length of first annular flange 132'. The combination of first annular flange 132' and second annular flange 136' forms an annular port channel 134' that permits the formation of a mechanical lock between the port and tube connector 126' as disclosed in more detail below.

A port tip 138' extends beyond second annular flange 136' with a cylindrical outer wall. Port 130' defines a port channel 140' that extends the length of the port and remains essentially uniform in cross section along the length of the port. Port channel 140' is in fluid communication with a capsule filter chamber (not shown) defined by filter capsule 124'.

A tube connector, shown generally as 126', defines a connector through-bore 142' defined by a conical connector inner wall 127'. Connector wall 127' is tapered in cross-section with the smaller diameter end of the taper located at a lower end of tube connector 126'. A tube connector bottom surface 139' is constructed to register against top surface 133' of first annular flange 132'. A bottom end of tube connector 126' is formed with an annular wall 144' recessed from inner wall 127' and dimensioned to fit within, and register against, bottom annular port channel 134'. The cross-sectional diameter of the channel formed by recessed annular wall 144' is greater than the cross-sectional diameter of inner wall 127' at its lower end.

An annular tube connector channel 146' is formed proximal to recessed annular wall 144' and is dimensioned to receive and register against second annular flange 136'. The segment of tube connector 126' in the region of channel 146' and annular wall 144' may have an outer cross-sectional diameter greater than the outer cross-sectional diameter of the remainder of the tube connector to provide sufficient tube connector material to create a robust connection between the tube connector and the port that can withstand the mechanical stresses placed upon the connector when connected to port 130'. The combination of the two annular flanges of port 130' and the features of tube connector channel 146' that register against the port flanges create a mechanical lock between the port and the tube connector.

When tube connector 126' is secured to port 130', an annular conically-shaped, tube-receiving gap, (tapered in cross-section) is formed between an outer surface of port tip 138' and connector inner wall 127' as shown in FIG. 24. The smaller end of the tapered annular gap is formed proximal to second annular flange 136'. The cross-sectional diameter of the small end is dimensioned to be less than the cross-sectional thickness of the wall of a tube, shown generally as 128'. This causes the tube wall at a tube end 129' to be compressed when inserted into the gap. The further the tube is inserted into the gap, the more the compression forces increase to secure the tube in the gap until the bottom of the gap is reached. It should be understood that insertion to the bottom of the gap is not required if sufficient compression is provided against the tube wall before the tube end reaches the bottom of the gap. In this regard, tube end 129' may or may not register against a top surface of second annular flange 136'.

With respect to the use of compression forces to secure tube 126', additional or alternative means may also be used to secure the tube to the tube connector/port combination including adhesives, friction fit surfaces and mechanical interlocking features. Some adhesion between the tube and tube connector/port combination may also occur if the connection is formed in a one-step molding process whereby the tube connector is formed around a pre-assembled combination of a pre-formed port and a pre-formed tube with tube end 129' secured over port tip 138'. The preassembled components are placed in a mold for compression or injection molding of the tube connector. Tube connector 126' may also be thermoformed about the tube and port combination.

If each piece is formed separately from the others before assembly, tube connector 126' is formed from materials that have sufficient elastic properties to permit tube connector 126' to be urged over tube end 129' and port tip 130'. In such an embodiment, the tube connector can be assembled initially to the port tip by urging tube connector 126' over port tip 130' until tube connector channel 146' is positioned over and against second annular flange 136'. Tube end 129' is then urged into the gap formed by the port/tube connector combination.

Alternatively, tube connector 126' can be pre-assembled to tube 128' with tube end 129' inserted into tube connector channel 142', the combination of which is then urged over port tip 138' with the port tip inserted into tube channel 145' until second annular flange 136' is registered against, and inside, tube connector channel 146'. It should be understood that any method used to assemble the port/tube connector/tube combination is within the scope and spirit of the disclosure.

Once assembled, a tube channel 145' defined by tube 128' is in fluid communication with port channel 140'. The cross-sectional diameter of port channel 140' may be set to equal the cross-sectional diameter of a relaxed, unstretched, uncompressed section of tube 128'. The mechanical interlocking features of port 130' and tube connector 126' along with the tube receiving features of the port/tube connector combination provide a robust, substantially air and fluid tight seal between the port/tube connector combination and the attached tube.

The port/tube connector combination shown in FIGS. 22 and 24 represents a linear, constricting tube embodiment in that one of the tube registration surfaces of the port tip and/or tube connector is substantially parallel with a longitudinal axis of the tube. In the case of the embodiment shown in FIGS. 22 and 24, the cylindrical outer wall of port tip 130' is substantially parallel with the tube connector's longitudinal axis. The conical inner wall 127' of tube connector 126' in combination with the cylindrical outer wall of port tip 130' creates a structural constriction feature that constricts the wall of tube 128' when positioned in the gap formed between inner wall 127' and the cylindrical outer wall of port tip 130'.

Figure 27:
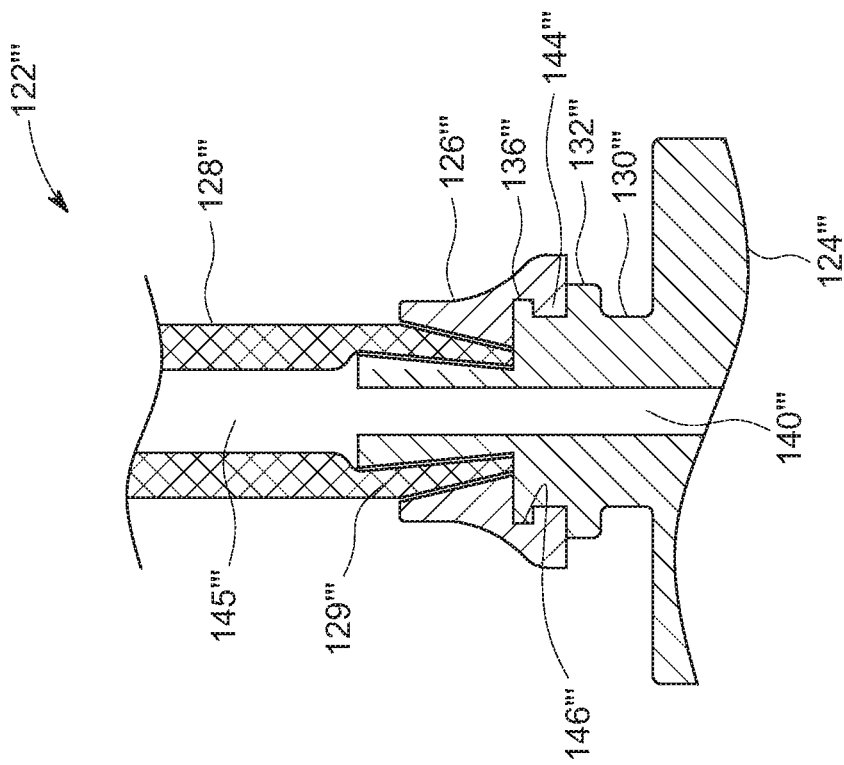
FIG. 27 is a side sectional view of the tube/tube connector/capsule assembly shown in FIG. 25.

Referring now to FIGS. 25 and 27, in a yet further embodiment of the disclosure, a capsule assembly designated generally as 122" includes a capsule, shown generally as 124". To form a connection-free junction between capsule 124" and a tube, a modified port 130", which can be either an inlet port or an outlet port, is formed with a first annular flange 132" that extends radially outwardly from the port wall to form a registration surface for tube connector 126". A top annular surface 133" of flange 132" functions as a registration surface for tube connector 126". A second annular flange 136" is formed about port 130" and extends radially outwardly from the port wall. Second annular flange 136" is formed at a point on port 130" more distal from the base of the port than first annular flange 132". The radial length of second annular flange 136" is less than the radial length of first annular flange 132". The combination of first annular flange 132" and second annular flange 136" forms an annular port channel 134" that permits the formation of a mechanical lock between the port and the tube connector as disclosed in more detail below.

A conical port tip 138" extends beyond second annular flange 136" and defines a tapered profile in cross section with the smaller diameter of the taper being formed at the end most distal from second annular flange 136". Port 130" defines a port channel 140" that extends the length of the port and remains essentially uniform in cross section along the length of the port. Port channel 140" is in fluid communication with a capsule filter chamber (not shown) defined by capsule 124".

A tube connector, shown generally as 126", defines a connector through-bore 142" defined by a conical connector inner wall 127". In this embodiment, connector wall 127" is formed with a conical profile (taper in cross-section), wherein the channel formed by inner wall 127" has a smaller cross-sectional diameter at an upper end of tube connector 126". A connector bottom surface 139" is constructed to register against top surface 133" of first annular flange 132". A bottom end of tube connector 126" is formed with an annular wall 144" recessed from inner wall 127" and dimensioned to fit about and register against bottom annular port channel 134". The cross-sectional diameter of the channel formed by recessed annular wall 144" is less than the cross-sectional diameter of inner wall 127" at its lower end.

An annular tube connector channel 146" is formed proximal to recessed annular wall 144" and is dimensioned to receive and register against second annular flange 136". The segment of tube connector 126" in the region of channel 146" and annular wall 144" may have an outer cross-sectional diameter greater than the outer cross-sectional diameter of remainder of the tube connector to provide sufficient tube connector material to create a robust connection between the tube connector and the port that can withstand the mechanical stresses placed upon the connector when connected to port 130". The combination of the two annular flanges of port 130" and the features of tube connector channel 146" that register against the port flanges create a mechanical lock between the port and the tube connector.

When tube connector 126" is secured to port 130", an annular conically-shaped, divergent tube-receiving gap, (tapered in cross-section) is formed between an outer surface of port tip 138" and connector inner wall 127" as shown in FIG. 27. The smaller end of the tapered annular gap is formed distal from second annular flange 136". In this embodiment, the cross-sectional diameter of the gap, i.e., the distance between the outer surface of port tip 138" and connector inner wall 127" is maintained substantially uniform along the length of the gap. The gap may or may not be dimensioned to be equal to, or less than the thickness of a wall of a tube, shown generally as 128". If the gap is dimensioned to be less than the thickness of the tube wall, this will cause the tube wall at a tube end 129" to be compressed when inserted into the gap as well as stretched out the further the tube is inserted into the gap. If the gap is dimensioned to be substantially the same as the thickness of the tube wall, the tube wall will not be compressed. Instead, the conical shape of the gap, which diverges increasingly from the longitudinal axis of the tube as the tube is urged further into the gap, will stretch out tube end 129" to secure tube 128" to tube connector 126". The further the tube is inserted into the gap, the more stretched out tube end 129" will be. It should be understood that insertion to the bottom of the gap is not required if the tube end is stretched sufficiently to secure the tube to the port/tube connector combination. In this regard, tube end 129" may or may not register against a top surface of second annular flange 136".

With respect to the use of compression forces to secure tube 126", additional or alternative means may also be used to secure the tube to the tube connector/port combination including adhesives, friction fit surfaces and mechanical interlocking features. Some adhesion between the tube and tube connector/port combination may also occur if the connection is formed in a one-step molding process whereby the tube connector is formed around a pre-assembled combination of a pre-formed port and pre-formed tube with tube end 129" secured over port tip 138". The preassembled components are placed in a mold for compression or injection molding of the tube connector. Tube connector 126" may also be thermoformed about the tube and port combination.

If each piece is formed separately from the others before assembly, tube connector 126" is formed from materials that have sufficient elastic properties to permit tube connector 126" to be urged over tube end 129" and port tip 130". In such an embodiment, the tube connector can be assembled initially to the port tip by urging tube connector 126" over port tip 130" until tube connector channel 146" is positioned over and against second annular flange 136". Tube end 129" is then urged into the gap formed by the port/tube connector combination.

Alternatively, tube connector 126" can be pre-assembled to tube 128" with tube end 129" inserted into tube connector channel 142", the combination of which is then urged over port tip 138" with the port tip inserted into tube channel 145" until second annular flange 136" is registered against, and inside, tube connector channel 146". It should be understood that any method used to assemble the port/tube connector/tube combination is within the scope and spirit of the disclosure.

Once assembled, a tube channel 145" defined by tube 128" is in fluid communication with port channel 140". The cross-sectional diameter of port channel 140" may be set to equal the cross-sectional diameter of a relaxed, unstretched, uncompressed and unobstructed section of tube 128". The mechanical interlocking features of port 130" and tube connector 126" along with the tube receiving features of the port/tube connector combination provide a robust, substantially air-tight and fluid-tight seal between the port/tube connector combination and the attached tube.

The port/tube connector combination shown in FIGS. 25 and 27 represents a divergent, non-constricting tube embodiment in that the tube registration surfaces of the port tip and the tube connector diverge from the longitudinal axis of the tube the further the gap extends from the tube insertion point at the distal end of the port tip. In the case of the embodiment shown in FIGS. 25 and 27, the conical outer wall of port tip 130" remains substantially parallel with the conical inner wall 127" of tube connector 126" with the distance between the tube registration surfaces being substantially equal to the thickness of tube 128" so as not to constrict the wall of tube 128". Thus, the embodiment is defined as a divergent, non-constricting tube embodiment.

Figure 26:
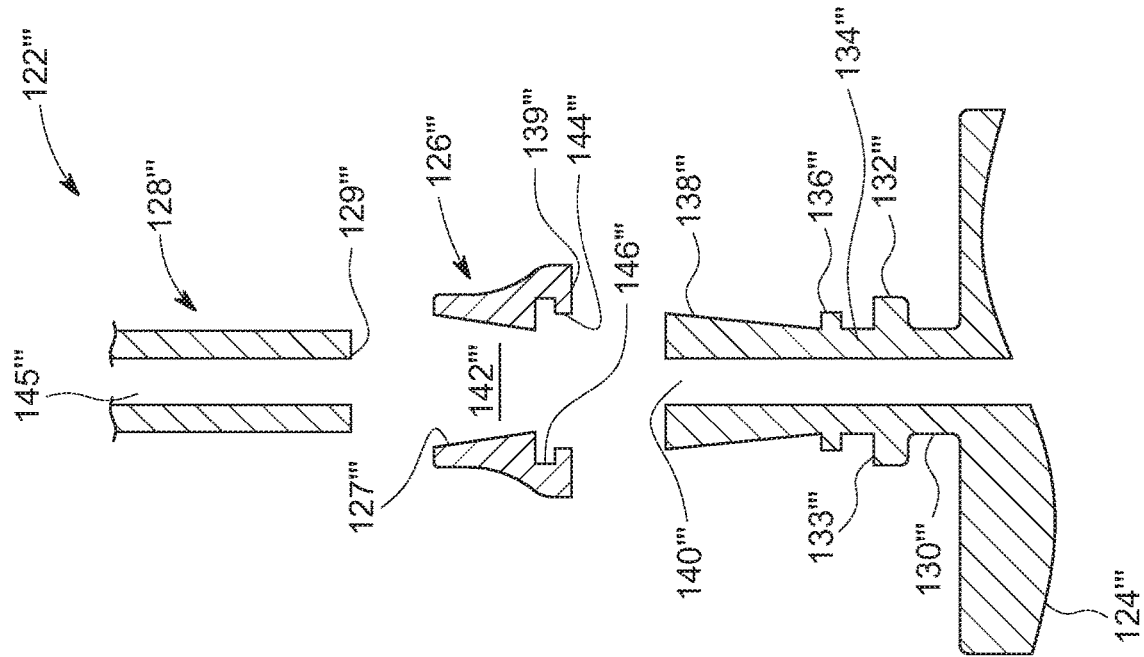
FIG. 26 is a side sectional exploded view of a tube/tube connector/capsule assembly according to a yet further embodiment of the disclosure.
Figure 28:
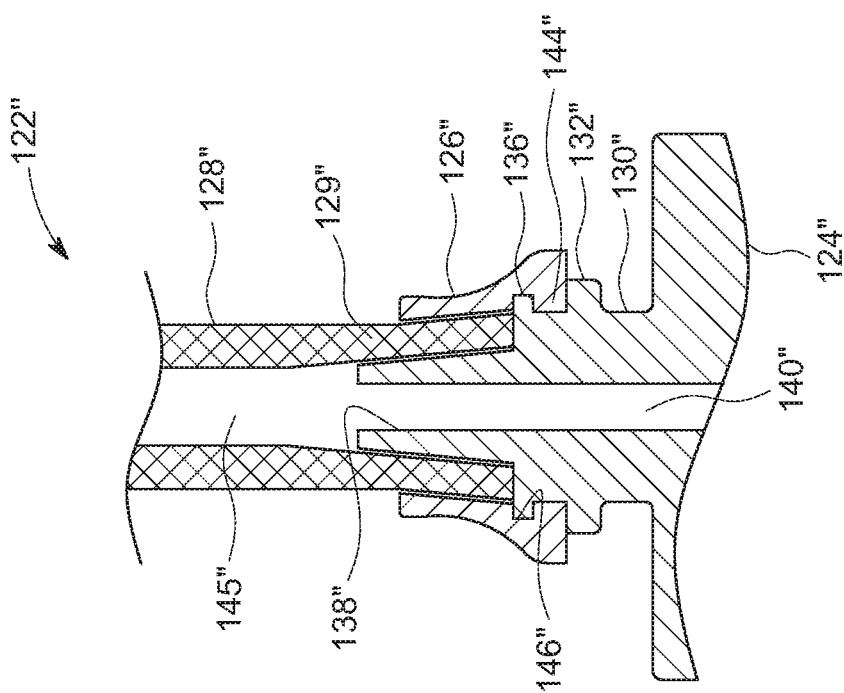
FIG. 28 is a side sectional view of the tube/tube connector/capsule assembly shown in FIG. 26.

Referring now to FIGS. 26 and 28, in a further embodiment of the disclosure, a capsule assembly designated generally as 122" includes a capsule, shown generally as 124". To form a connection-free junction between capsule 124" and a tube, a modified port 130''', which can be either an inlet port or an outlet port, is formed with a first annular flange 132''' that extends radially outwardly from the port wall to form a registration surface for a tube connector 126'''. A top annular surface 133''' of flange 132''' functions as a registration surface for tube connector 126'''. A second annular flange 136''' is formed about port 130''' and extends radially outwardly from the port wall. Second annular flange 136''' is formed at a point on port 130''' more distal from the base of the port than first annular flange 132'''. The radial length of second annular flange 136''' is less than the radial length of first annular flange 132'''. The combination of first annular flange 132''' and second annular flange 136''' forms an annular port channel 134''' that permits the formation of a mechanical lock between the port and the tube connector as disclosed in more detail below.

A conical port tip 138''' extends beyond second annular flange 136''' and defines a tapered profile in cross section with the smaller diameter of the taper being formed proximal to second annular flange 136". Port 130''' defines a port channel 140''' that extends the length of the port and remains essentially uniform in cross-section along the length of the port. Port channel 140''' is in fluid communication with the capsule filter chamber.

A tube connector, shown generally as 126''', defines a conical connector through-bore 142''' defined by a conical connector inner wall 127'''. In this embodiment, connector wall 127''' is tapered in cross-section with the smaller diameter end of the taper located at a lower end of tube connector 126'''. A connector bottom surface 139''' is constructed to register against top surface 133''' of first annular flange 132'''. A bottom end of tube connector 126''' is formed with an annular wall 144''' recessed from inner wall 127''' and dimensioned to fit within, and register against, bottom annular port channel 134'''. The cross-sectional diameter of the channel formed by recessed annular wall 144''' is greater than the cross-sectional diameter of the lower end of inner wall 127'''.

An annular tube connector channel 146''' is formed proximal to recessed annular wall 144''' and is dimensioned to receive, and register against, second annular flange 136'''. The segment of tube connector 126''' in the region of channel 146''' and annular wall 144''' may have an outer cross-sectional diameter greater than the outer cross-sectional diameter of the remainder of the tube connector to provide sufficient tube connector material to create a robust connection between the tube connector and the port that can withstand the mechanical stresses placed upon the connector when connected to port 130'''. The combination of the two annular flanges of port 130''' and the features of tube connector channel 146''' that register against the port flanges create a mechanical lock between the port and the tube connector.

When tube connector 126''' is secured to port 130''', an annular conically-shaped, convergent tube-receiving gap, (tapered in cross-section) is formed between an outer surface of port tip 138''' and connector inner wall 127''' as shown in FIG. 28. The smaller end of the tapered annular gap is formed proximal to second annular flange 136'''. In this embodiment, the cross-sectional diameter of the gap, i.e., the distance between the outer surface of port tip 138''' and connector inner wall 127''' is maintained substantially uniform along the length of the gap.

The gap may or may not be dimensioned to be equal to, or less than, the thickness of a wall of a tube, shown generally as 128'''. If the gap is dimensioned to be less than the thickness of the tube wall, this will cause the tube wall at a tube end 129''' to be compressed when inserted into the gap as well as stretched out at the distal end of the port tip/tube connector combination as the tube is inserted into the gap. If the gap is dimensioned to be substantially the same as the thickness of the tube wall, the tube wall will not be compressed. Instead, the conical shape of the gap, which converges increasingly toward the longitudinal axis of the tube as the tube is urged further into the gap, will stretch out tube end 129''' as it passes the distal end of the port tip/tube connector combination and return tube end 129''' toward its initial unstretched condition as the tube end travels toward the lower end of the gap. The further the tube is inserted into the gap, the further the stretched-out portion of the tube will be from tube end 129'''. It should be understood that insertion of the tube to the bottom of the gap is not required if the distance between the stretched section of the tube and the tube end is sufficient to secure the tube to the port/tube connector combination. In this regard, tube end 129''' may or may not register against a top surface of second annular flange 136'''.

With respect to the use of compression forces to secure tube 126''', additional or alternative means may also be used to secure the tube to the tube connector/port combination including adhesives, friction fit surfaces and mechanical interlocking features. Some adhesion between the tube and tube connector/port combination may also occur if the connection is formed in a one-step molding process whereby the tube connector is formed around a pre-assembled combination of a pre-formed port and pre-formed tube with tube end 129''' secured over port tip 138'''. The preassembled components are placed in a mold for compression or injection molding of the tube connector. Tube connector 126''' may also be thermoformed about the tube and port combination.

If each piece is formed separately from the others before assembly, tube connector $126'''$ is formed from materials that have sufficient elastic properties to permit tube connector $126'''$ to be urged over tube end $129'''$ and port tip $130'''$. In such an embodiment, the tube connector can be assembled initially to the port tip by urging tube connector $126'''$ over port tip $130'''$ until tube connector channel $146'''$ is positioned over and against second annular flange $136'''$. Tube end $129'''$ is then urged into the gap formed by the port/tube connector combination.

Alternatively, tube connector $126'''$ can be pre-assembled to tube $128'''$ with tube end $129'''$ inserted into tube connector channel $142'''$, the combination of which is then urged over port tip $138'''$ with the port tip inserted into tube channel $145'''$ until second annular flange $136'''$ is registered against, and inside, tube connector channel $146'''$. It should be understood that any method used to assemble the port/tube connector/tube combination is within the scope and spirit of the disclosure.

Once assembled, a tube channel $145'''$ defined by tube $128'''$ is in fluid communication with port channel $140'''$. The cross-sectional diameter of port channel $140'''$ may be set to equal the cross-sectional diameter of a relaxed, unstretched, uncompressed section of tube $128'''$. The mechanical interlocking features of port $130'''$ and tube connector $126'''$ along with the tube receiving features of the port/tube connector combination provide a robust, substantially air-tight and fluid-tight seal between the port/tube connector combination and the attached tube.

The port/tube connector combination shown in FIGS. 26 and 28 represents a convergent, non-constricting tube embodiment in that the tube registration surfaces of the port tip and the tube connector converge toward the longitudinal axis of the tube the further the gap extends from the tube insertion point at the distal end of the port tip. In the case of the embodiment shown in FIGS. 26 and 28, the conical outer wall of port tip $130'''$ remains substantially parallel with the conical inner wall $127'''$ of tube connector $126'''$ with the distance between the tube registration surfaces being substantially equal to the thickness of tube $128'''$ so as not to constrict the wall of tube $128'''$. Thus, the embodiment is defined as a convergent, non-constricting tube embodiment. Conversely, if the distance between the outer wall of port tip $130'''$ and inner wall $127'''$ is less than the thickness of the wall of tube $128'''$, the embodiment would be characterized as a convergent, constricting tube embodiment.

Figure 29:
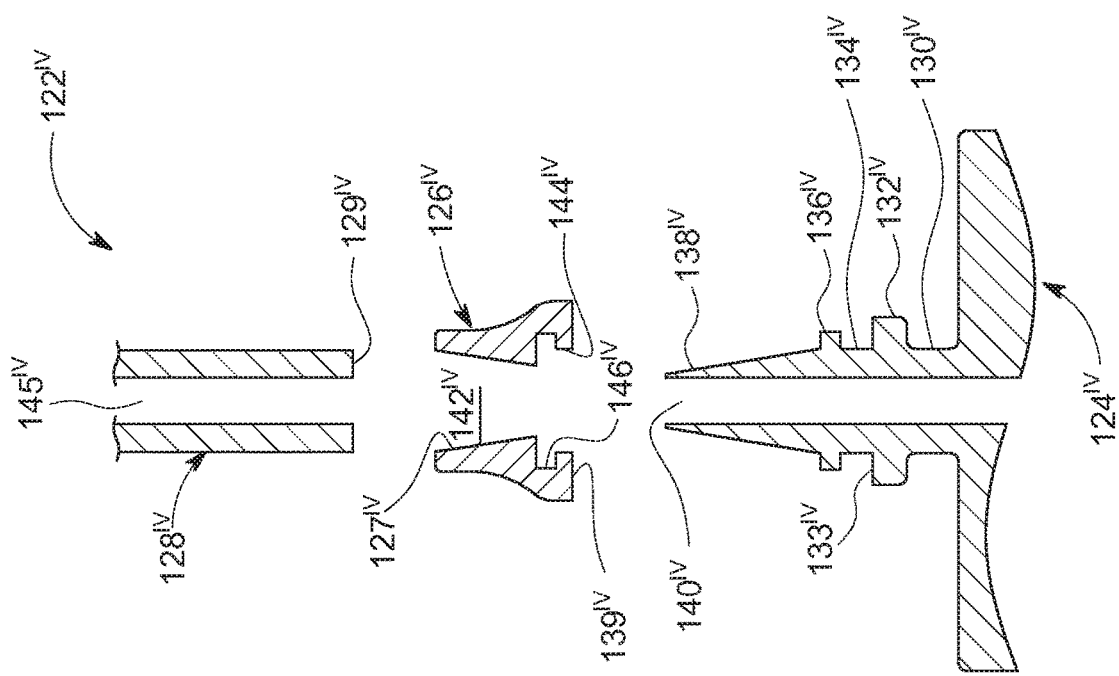
FIG. 29 is a side sectional exploded view of a tube/tube connector/capsule assembly according to a still further embodiment of the disclosure.
Figure 31:
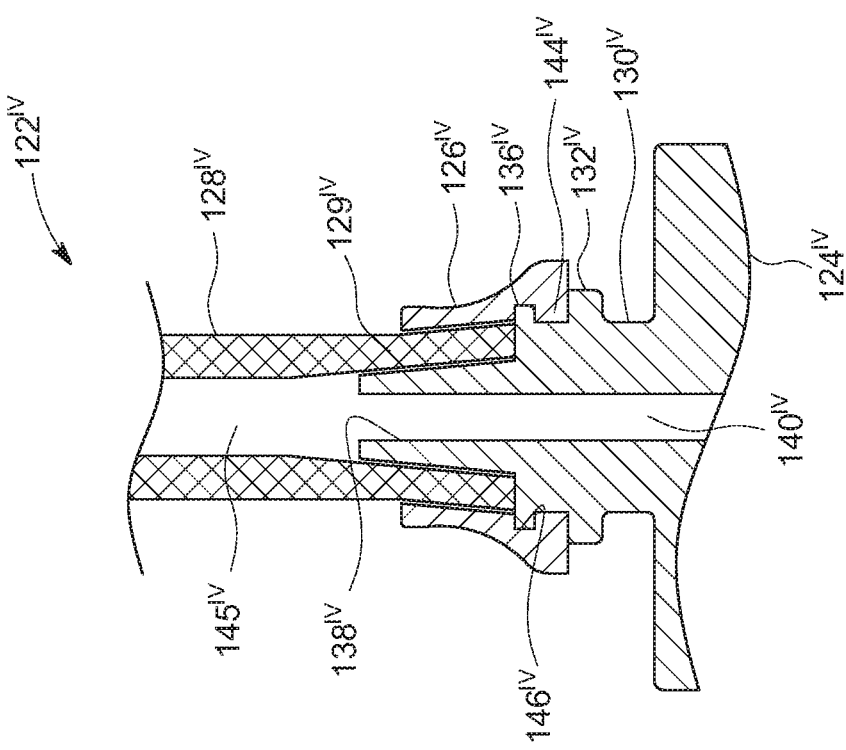
FIG. 31 is a side sectional view of the tube/tube connector/capsule assembly shown in FIG. 29.

Referring now to FIGS. 29 and 31, in another embodiment of the disclosure, a capsule assembly designated generally as $122^{IV}$ includes a capsule, shown generally as $124^{IV}$. To form a connection-free junction between capsule $124^{IV}$ and a tube, a modified port $130^{IV}$, which can be either an inlet port or an outlet port, is formed with a first annular flange $132^{IV}$ that extends radially outwardly from the port wall to form a registration surface for tube connector $126^{IV}$. A top annular surface $133^{IV}$ of flange $132^{IV}$ functions as a registration surface for tube connector $126^{IV}$. A second annular flange $136^{IV}$ is formed about port $130^{IV}$ and extends radially outwardly from the port wall. Second annular flange $136^{IV}$ is formed at a point on port $130^{IV}$ more distal from the base of the port than first annular flange $132^{IV}$. The radial length of second annular flange $136^{IV}$ is less than the radial length of first annular flange $132^{IV}$. The combination of first annular flange $132^{IV}$ and second annular flange $136^{IV}$ forms an annular port channel $134^{IV}$ that permits the formation of a mechanical lock between the port and the tube connector as disclosed in more detail below.

A conical port tip $138^{IV}$ extends beyond second annular flange $136^{IV}$ and defines a tapered profile in cross section with the smaller diameter of the taper being formed at the end most distal to second annular flange $136^{IV}$. Port $130^{IV}$ defines a port channel $140^{IV}$ that extends the length of the port and remains essentially uniform in cross section along the length of the port. Port channel $140^{IV}$ is in fluid communication with a capsule filter chamber (not shown) defined by capsule $124^{IV}$.

A tube connector, shown generally as $126^{IV}$, defines a connector through-bore $142^{IV}$ defined by a conical connector inner wall $127^{IV}$. In this embodiment, inner wall $127^{IV}$ is tapered in cross section with the smaller end of the taper being formed proximal to second annular flange $136^{IV}$. A connector bottom surface $139^{IV}$ is constructed to register against top surface $133^{IV}$ of first annular flange $132^{IV}$. A bottom end of tube connector $126^{IV}$ is formed with an annular wall $144^{IV}$ recessed from inner wall $127^{IV}$ and dimensioned to fit within, and register against, bottom annular port channel $134^{IV}$. The cross-sectional diameter of the channel formed by recessed annular wall $144^{IV}$ is greater than the cross-sectional diameter of through-bore $142^{IV}$ at the smaller taper end.

An annular tube connector channel $146^{IV}$ is formed proximal to recessed annular wall $144^{IV}$ and is dimensioned to receive, and register against, second annular flange $136^{IV}$. The segment of tube connector $126^{IV}$ in the region of channel $146^{IV}$ and annular wall $144^{IV}$ may have an outer cross-sectional diameter greater than the outer cross-sectional diameter of the remainder of the tube connector to provide sufficient tube connector material to create a robust connection between the tube connector and the port that can withstand the mechanical stresses placed upon the connector when connected to port $130^{IV}$. The combination of the two annular flanges of port $130^{IV}$ and the features of tube connector channel $146^{IV}$ that register against the port flanges create a mechanical lock between the port and the tube connector.

When tube connector $126^{IV}$ is secured to port $130^{IV}$, an annular conically-shaped, tube-receiving gap, (tapered in cross-section) is formed between an outer surface of port tip $138^{IV}$ and connector inner wall $127^{IV}$ as shown in FIG. 29. The smaller end of the tapered annular gap is formed proximal to second annular flange $136^{IV}$. The cross-sectional diameter of the small end is dimensioned to be less than the cross-sectional thickness of the wall of a tube, shown generally as $128^{IV}$. This causes the tube wall at a tube end $129^{IV}$ to be compressed when inserted into the gap. The further the tube is inserted into the gap, the more the compression forces increase to secure the tube in the gap until the bottom of the gap is reached. It should be understood that insertion to the bottom of the gap is not required if sufficient compression is provided against the tube wall before the tube end reaches the bottom of the gap. In this regard, tube end $129^{IV}$ may or may not register against a top surface of second annular flange $136^{IV}$.

With respect to the use of compression forces used to secure tube $126^{IV}$, in similar fashion to the other disclosed embodiments, additional or alternative means may also be used to secure the tube to the tube connector/port combination including adhesives, friction fit surfaces and mechanical interlocking features. Some adhesion between the tube and tube connector/port combination may also occur if the connection is formed in a one-step molding process whereby the tube connector is formed around a pre-assembled combination of a pre-formed port and pre-formed tube with tube end $129^{IV}$ secured over port tip $138^{IV}$. The preassembled components are placed in a mold for compression or injection molding of the tube connector. Tube connector $126^{IV}$ may also be thermoformed about the tube and port combination.

If each piece is formed separately from the others before assembly, tube connector $126^{IV}$ is formed from materials that have sufficient elastic properties to permit tube connector $126^{IV}$ to be urged over tube end $129^{IV}$ and port tip $130^{IV}$. In such an embodiment, the tube connector can be assembled initially to the port tip by urging tube connector $126^{IV}$ over port tip $130^{IV}$ until tube connector channel $146^{IV}$ is positioned over and against second annular flange $136^{IV}$. Tube end $129^{IV}$ is then urged into the gap formed by the port/tube connector combination.

Alternatively, tube connector $126^{IV}$ can be pre-assembled to tube $128^{IV}$ with tube end $129^{IV}$ inserted into tube connector channel $142^{IV}$, the combination of which is then urged over port tip $138^{IV}$ with the port tip inserted into a tube channel $145^{IV}$ until second annular flange $136^{IV}$ is registered against, and inside, tube connector channel $146^{IV}$. It should be understood that any method used to assemble the port/tube connector/tube combination is within the scope and spirit of the disclosure.

Once assembled, tube channel $145^{IV}$ defined by tube $128^{IV}$ is in fluid communication with port channel $140^{IV}$. The cross-sectional diameter of port channel $140^{IV}$ may be set to equal the cross-sectional diameter of a relaxed, unstretched, uncompressed and unobstructed section of tube $128^{IV}$. The mechanical interlocking features of port $130^{IV}$ and tube connector $126^{IV}$ along with the tube receiving features of the port/tube connector combination provide a robust, substantially air-tight and fluid-tight seal between the port/tube connector combination and the attached tube.

The port/tube connector combination shown in FIGS. 29 and 31 represents a divergent, constricting tube embodiment in that the tube registration surfaces of the port tip that partially forms the port/tube connector gap diverges way from a center line of the tube the further the gap extends from the tube insertion point at the distal end of the port tip. In the case of the embodiment shown in FIGS. 29 and 31, the conical outer wall of port tip $130^{IV}$ tapers outwardly from a distal end to a proximal end, which will urge a tube end to extend and expand away from its center line the further the tube is urged onto the port tip. In this regard, the embodiment is properly classified as a divergent embodiment. Because conical inner wall $127^{IV}$ of tube connector $126^{IV}$ tapers inwardly from a distal end to a proximal end, the proximal end is positioned opposite the proximal, large taper end of the port tip outer wall so as to form a constricting gap at the proximal end of the gap. This constricted portion of the gap will impart compressive, constricting forces against the wall of tube end $129^{IV}$ when the tube is urged into the proximal end of the gap. Thus, the embodiment is defined as a divergent, constricting tube embodiment.

Figure 30:
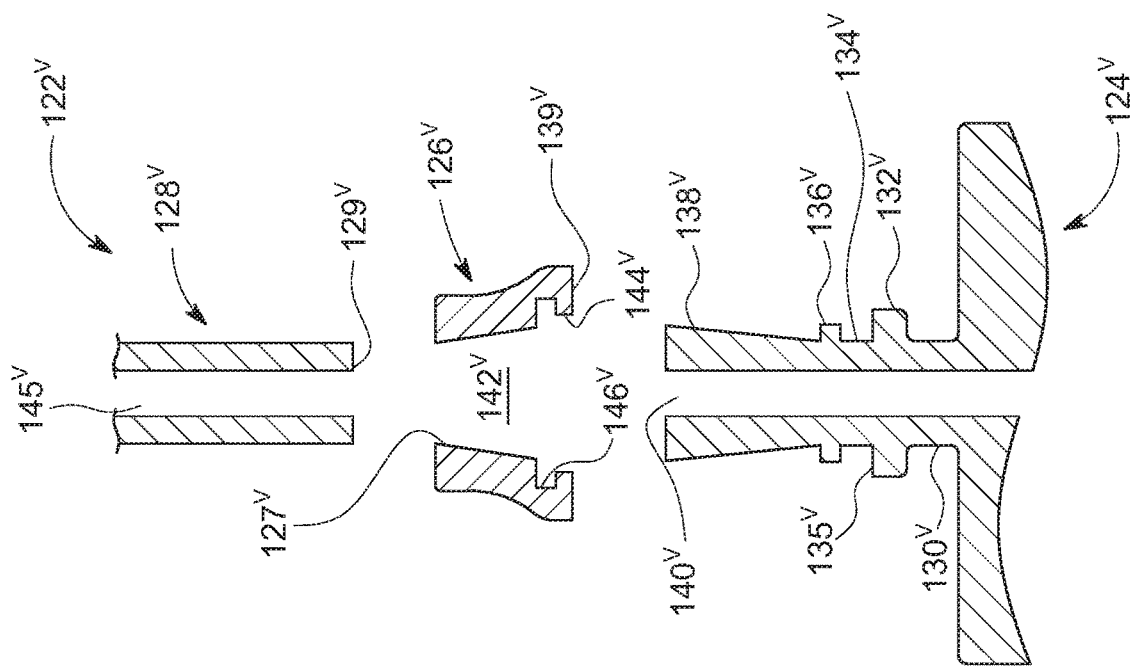
FIG. 30 is a side sectional exploded view of a tube/tube connector/capsule assembly according to yet another embodiment of the disclosure.
Figure 32:
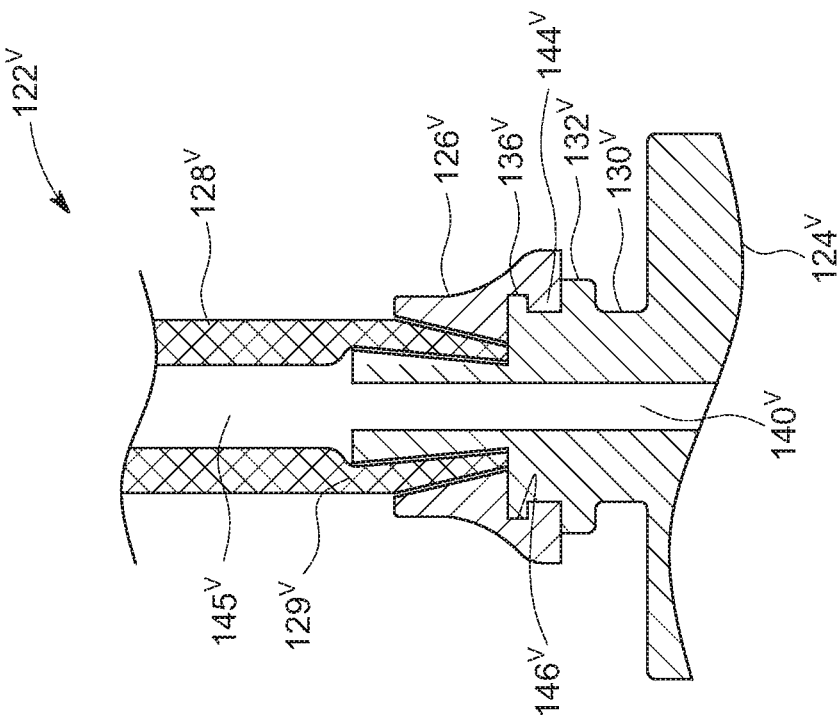
FIG. 32 is a side sectional view of the tube/tube connector/capsule assembly shown in FIG. 30.

Referring now to FIGS. 30 and 32, in yet another embodiment of the disclosure, a capsule assembly designated generally as $122^{V}$ includes a capsule, shown generally as $124^{V}$. To form a connection-free junction between capsule $124^{V}$ and a tube, a modified port $130^{V}$, which can be either an inlet port or an outlet port, is formed with a first annular flange $132^{V}$ that extends radially outwardly from the port wall to form a registration surface for tube connector $126^{V}$. A top annular surface $133^{V}$ of flange $132^{V}$ functions as a registration surface for tube connector $126^{V}$. A second annular flange $136^{V}$ is formed about port $130^{V}$ and extends radially outwardly from the port wall. Second annular flange $136^{V}$ is formed at a point on port $130^{V}$ more distal from the base of the port than first annular flange $132^{V}$. The radial length of second annular flange $136^{V}$ is less than the radial length of first annular flange $132^{V}$. The combination of first annular flange $132^{V}$ and second annular flange $136^{V}$ forms an annular port channel $134^{V}$ that permits the formation of a mechanical lock between the port and the tube connector as disclosed in more detail below.

A conical port tip $138^{V}$ extends beyond second annular flange $136^{V}$ and defines a tapered profile in cross section with the smaller diameter of the taper being formed proximal to second annular flange $136^{V}$. The larger end of the port tip taper may have the annular edges of the distal end chamfered or radiused to present a smooth transition surface for receiving a tube as disclosed in more detail herein. Port $130^{V}$ defines a port channel $140^{V}$ that extends the length of the port and remains essentially uniform in cross section along the length of the port. Port channel $140^{V}$ is in fluid communication with a capsule filter chamber (not shown) defined by capsule $124^{V}$.

A tube connector, shown generally as $126^{V}$, defines a connector through-bore $142^{V}$ defined by a conical connector inner wall $127^{V}$. In this embodiment, connector inner wall $127^{V}$ is tapered in cross section with the smaller end of the taper distal from second annular flange $136^{V}$. A connector bottom surface $139^{V}$ is constructed to register against top surface $133^{V}$ of first annular flange $132^{V}$. A bottom end of tube connector $126^{V}$ is formed with an annular wall $144^{V}$ recessed from inner wall $127^{V}$ and dimensioned to fit about and register against bottom annular port channel $134^{V}$. The cross-sectional diameter of the channel formed by recessed annular wall $144^{V}$ is substantially equal to, or less than, the cross-sectional diameter of through-bore $142^{V}$.

An annular tube connector channel $146^{V}$ is formed proximal to recessed annular wall $144^{V}$ and is dimensioned to receive and register against second annular flange $136^{V}$. The segment of tube connector $126^{V}$ in the region of channel $146^{V}$ and annular wall $144^{V}$ may have an outer cross-sectional diameter greater than the outer cross-sectional diameter of remainder of the tube connector to provide sufficient tube connector material to create a robust connection between the tube connector and the port that can withstand the mechanical stresses placed upon the connector when connected to port $130^{V}$. The combination of the two annular flanges of port $130^{V}$ and the features of tube connector channel $146^{V}$ that register against the port flanges create a mechanical lock between the port and the tube connector.

When tube connector $126^{V}$ is secured to port $130^{V}$, an annular conically-shaped, tube-receiving gap, (tapered in cross-section) is formed between an outer surface of port tip $138^{V}$ and connector inner wall $127^{V}$ as shown in FIG. 32. The smaller end of the tapered annular gap is formed distal from second annular flange $136^{V}$. The cross-sectional dimension of the taper smaller end is dimensioned to be equal to, or less than, the cross-sectional thickness of the wall of a tube, shown generally as $128^{V}$. If the cross-sectional dimension of the tapered gap smaller end is less than the thickness of the tube wall, the tube wall at a tube end $129^{V}$ is compressed by the taper smaller end when inserted into the gap. As the tube end $129^{V}$ progresses past the distal end of the gap, the compressive forces applied to the tube end wall are released as the cross-sectional dimension of the gap increases to be equal to, or greater than, the thickness of the tube end wall. Once tube $128^{V}$ is fully seated in the gap, the only portions of the tube wall that are compressed are located in registration with the gap taper smaller end.

Conversely, if the cross-sectional dimension of the tapered gap is equal to the thickness of the tube wall, the tube wall at tube end $129^V$ will not be compressed by the gap taper smaller end. Instead, the width of port tip $130^V$ at a proximal end, will be less than the cross-sectional dimension of the port tip distal end. As such, the reducing cross-sectional dimension of the port tip proximal end will permit tube end $129^V$ superposed about the port tip to return toward its pre-stretched dimension. Tube end $129^V$ will return to its pre-expanded diameter as the tube end travels past the distal end of port tip $130^V$ and follows the downwardly reducing taper of port tip $130^V$ back toward a centerline of tube $128^V$. The further the tube is inserted into the gap, the more the compression forces applied to the tube wall will be displaced away from tube end $129^V$. It should be understood that insertion of the tube to the bottom of the gap is not required if compression is provided against the tube wall to sufficiently secure the tube in the port/tube connector combination, before the tube end reaches the bottom of the gap. In this regard, tube end $129^V$ may or may not register against a top surface of second annular flange $136^V$.

With respect to the use of compression forces to secure tube $126^V$, additional or alternative means may also be used to secure the tube to the tube connector/port combination including adhesives, friction fit surfaces and mechanical interlocking features. Some adhesion between the tube and tube connector/port combination may also occur if the connection is formed in a one-step molding process whereby the tube connector is formed around a pre-assembled combination of a pre-formed port and pre-formed tube with tube end $129^V$ secured over port tip $138^V$. The preassembled components are placed in a mold for compression or injection molding of the tube connector. Tube connector $126^V$ may also be thermoformed about the tube and port combination.

If each piece is formed separately from the others before assembly, tube connector $126^V$ is formed from materials that have sufficient elastic properties to permit tube connector $126^V$ to be urged over tube end $129^V$ and port tip $130^V$. In such an embodiment, the tube connector can be assembled initially to the port tip by urging tube connector $126^V$ over port tip $130^V$ until tube connector channel $146^V$ is positioned over and against second annular flange $136^V$. Tube end $129^V$ is then urged into the gap formed by the port/tube connector combination.

Alternatively, tube connector $126^V$ can be pre-assembled to tube $128^V$ with tube end $129^V$ inserted into tube connector channel $142^V$, the combination of which is then urged over port tip $138^V$ with the port tip inserted into a tube channel $145^V$ until second annular flange $136^V$ is registered against, and inside, tube connector channel $146^V$. It should be understood that any method used to assemble the port/tube connector/tube combination is within the scope and spirit of the disclosure.

Once assembled, a tube channel $145^V$ defined by tube $128^V$ is in fluid communication with port channel $140^V$. The cross-sectional diameter of port channel $140^V$ may be set to equal the cross-sectional diameter of a relaxed, unstretched, uncompressed and unobstructed section of tube $128^V$. The mechanical interlocking features of port $130^V$ and tube connector $126^V$ along with the tube receiving features of the port/tube connector combination provide a robust, substantially air-tight and fluid-tight seal between the port/tube connector combination and the attached tube.

The port/tube connector combination shown in FIGS. 30 and 32 represents a convergent, constricting or non-constricting tube embodiment in that the tube registration surfaces of the port tip that partially forms the port/tube connector gap converges toward a center line of the tube the further the gap extends from the tube insertion point at the distal end of the port tip. In the case of the embodiment shown in FIGS. 30 and 32, the conical outer wall of port tip $130^V$ tapers inwardly from a distal end to a proximal end, which will permit a tube end to relax and return toward its center line the further the tube is urged onto the port tip. In this regard, the embodiment is properly classified as a convergent embodiment.

With respect to constriction, because conical inner wall $127^V$ of tube connector $126^V$ tapers outwardly from a distal end to a proximal end, the distal end is positioned opposite the distal, large taper end of the port tip outer wall so as to form a constricting gap at the distal end of the gap. This constricted portion of the gap will impart compressive, constricting forces against the wall of tube end $129^V$ when the tube is urged over the distal end of the gap. Thus, the embodiment is defined as a convergent, constricting tube embodiment.

If the dimension of the gap at its distal end is equal to, or greater than, the cross-sectional thickness of the tube wall, then the gap will not compress the tube wall and this will be classified properly as non-constricting. For such an embodiment, the width or diameter of the port tip distal end should be greater in dimension than the cross-sectional diameter of the tube channel or lumen to create an anchor point to secure the tube to the port/tube connector combination.

Figure 33:
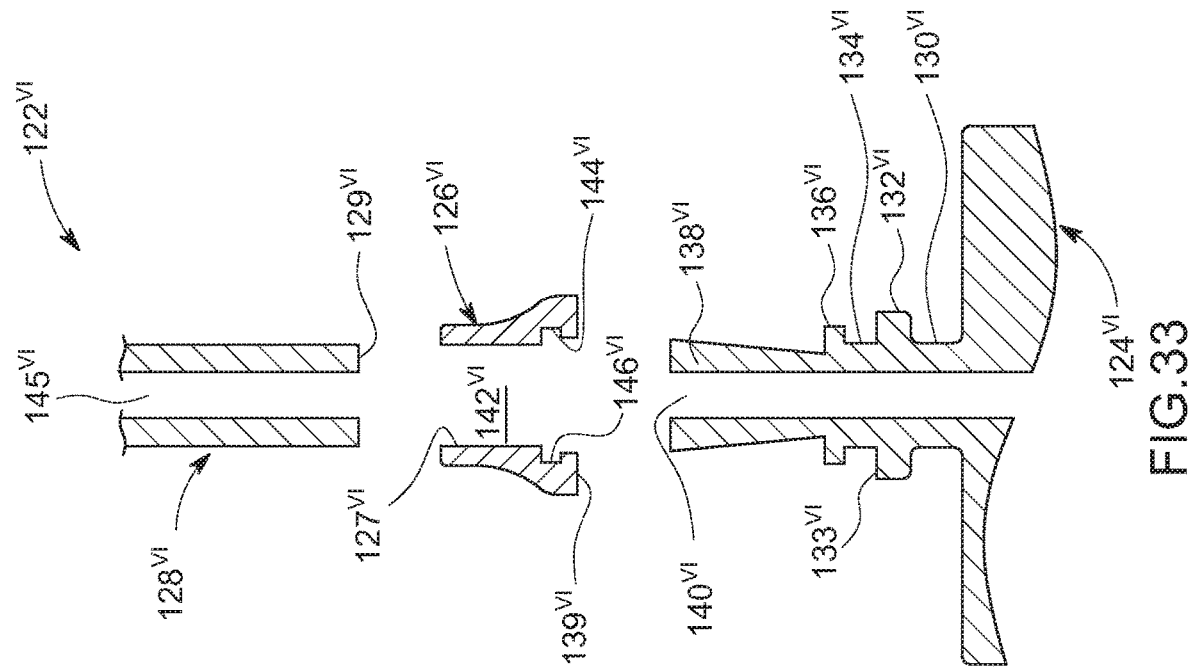
FIG. 33 is a side sectional exploded view of a tube/tube connector/capsule assembly according to a still further embodiment of the disclosure.
Figure 35:
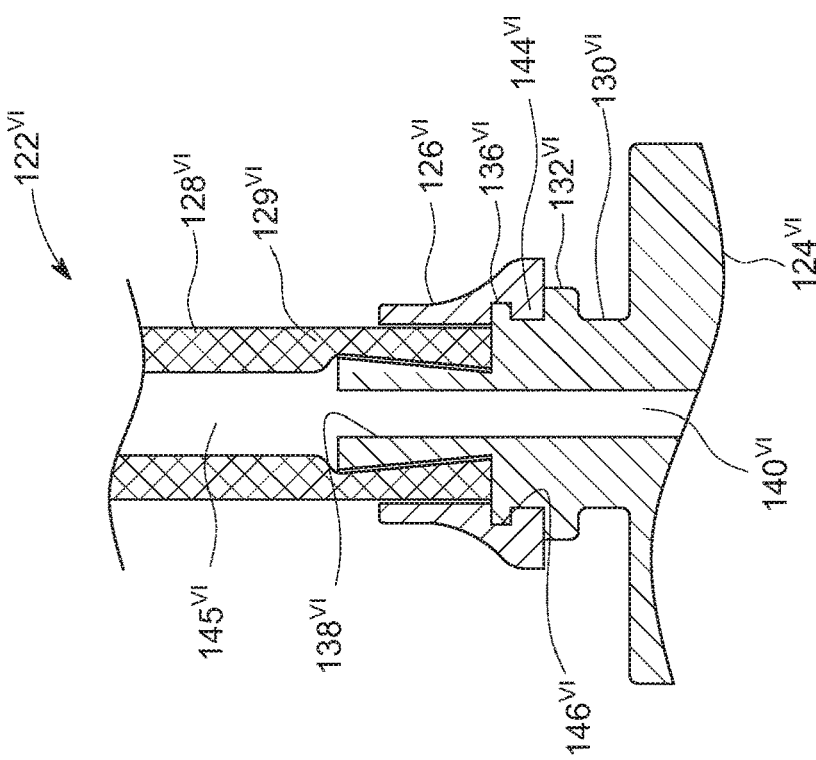
FIG. 35 is a side sectional view of the tube/tube connector/capsule assembly shown in FIG. 33.

Referring now to FIGS. 33 and 35, in yet another aspect of the disclosure, a capsule assembly designated generally as $122^{VI}$ includes a capsule, shown generally as $124^{VI}$. To form a connection-free junction between capsule $124^{VI}$ and a tube, a modified port $130^{VI}$, which can be either an inlet port or an outlet port, is formed with a first annular flange $132^{VI}$ that extends radially outwardly from the port wall to form a registration surface for tube connector $126^{VI}$. A top annular surface $133^{VI}$ of flange $132^{VI}$ functions as a registration surface for tube connector $126^{VI}$. A second annular flange $136^{VI}$ is formed about port $130^{VI}$ and extends radially outwardly from the port wall. Second annular flange $136^{VI}$ is formed at a point on port $130^{VI}$ more distal from the base of the port than first annular flange $132^{VI}$. The radial length of second annular flange $136^{VI}$ is less than the radial length of first annular flange $132^{VI}$. The combination of first annular flange $132^{VI}$ and second annular flange $136^{VI}$ forms an annular port channel $134^{VI}$ that permits the formation of a mechanical lock between the port and the tube connector as disclosed in more detail below.

A port tip $138^{VI}$ extends beyond second annular flange $136^{VI}$ and defines a tapered profile in cross section with the smaller diameter of the taper being formed at the point most distal to the second annular flange. Port $130^{VI}$ defines a port channel $140^{VI}$ that extends the length of the port and remains essentially uniform in cross section along the length of the port. Port channel $140^{VI}$ is in fluid communication with the capsule filter chamber.

A tube connector, shown generally as $126^{VI}$, defines a cylindrical connector through-bore $142^{VI}$ defined by a connector inner wall $127^{VI}$. In this embodiment, connector through-bore $142^{VI}$ is uniform in cross section along its length. A connector bottom surface $139^{VI}$ is constructed to register against top surface $133^{VI}$ of first annular flange $132^{VI}$. A bottom end of tube connector $126^{VI}$ is formed with an annular wall $144^{VI}$ recessed from inner wall $127^{VI}$ and dimensioned to fit within, and register against, bottom annular port channel $134^{VI}$. The cross-sectional diameter of the channel formed by recessed annular wall $144^{VI}$ is equal to, or greater than, the cross-sectional diameter of through-bore $142^{VI}$.

An annular tube connector channel $146^{VI}$ is formed proximal to recessed annular wall $144^{VI}$ and is dimensioned to receive and register against second annular flange $136^{VI}$. The segment of tube connector $126^{VI}$ in the region of channel $146^{VI}$ and annular wall $144^{VI}$ may have an outer cross-sectional diameter greater than the outer cross-sectional diameter of remainder of the tube connector to provide sufficient tube connector material to create a robust connection between the tube connector and the port that can withstand the mechanical stresses placed upon the connector when connected to port $130^{VI}$. The combination of the two annular flanges of port $130^{VI}$ and the features of tube connector channel $146^{VI}$ that register against the port flanges create a mechanical lock between the port and the tube connector.

When tube connector $126^{VI}$ is secured to port $130^{VI}$, an annular conically-shaped, tube-receiving gap, (tapered in cross-section) is formed between an outer surface of port tip $138^{VI}$ and connector inner wall $127^{VI}$ as shown in FIG. 35. The smaller end of the tapered annular gap is formed proximal to second annular flange $136^{VI}$. The cross-sectional diameter of the taper small end is dimensioned to be less than the cross-sectional thickness of the wall of a tube, shown generally as $128^{VI}$. This causes the tube wall at a tube end $129^{VI}$ to be compressed when inserted into the bottom of the gap. The further the tube is inserted into the gap, the more the compression forces increase to secure the tube in the gap until the bottom of the gap is reached. It should be understood that insertion to the bottom of the gap is not required if sufficient compression is provided against the tube wall before the tube end reaches the bottom of the gap. In this regard, tube end $129^{VI}$ may or may not register against a top surface of second annular flange $136^{VI}$.

With respect to the use of compression forces to secure tube $126^{VI}$, additional or alternative means may also be used to secure the tube to the tube connector/port combination including adhesives, friction fit surfaces and mechanical interlocking features. Some adhesion between the tube and tube connector/port combination may also occur if the connection is formed in a one-step molding process whereby the tube connector is formed around a pre-assembled combination of a pre-formed port and pre-formed tube with tube end $129^{VI}$ secured over port tip $138^{VI}$. The preassembled components are placed in a mold for compression or injection molding of the tube connector. Tube connector $126^{VI}$ may also be thermoformed about the tube and port combination.

If each piece is formed separately from the others before assembly, tube connector $126^{VI}$ is formed from materials that have sufficient elastic properties to permit tube connector $126^{VI}$ to be urged over tube end $129^{VI}$ and port tip $130^{VI}$. In such an embodiment, the tube connector can be assembled initially to the port tip by urging tube connector $126^{VI}$ over port tip $130^{VI}$ until tube connector channel $146^{VI}$ is positioned over and against second annular flange $136^{VI}$. Tube end $129^{VI}$ is then urged into the gap formed by the port/tube connector combination until anchored sufficiently to prevent disengagement.

Alternatively, tube connector $126^{VI}$ can be pre-assembled to tube $128^{VI}$ with tube end $129^{VI}$ inserted into tube connector channel $142^{VI}$, the combination of which is then urged over port tip $138^{VI}$ with the port tip inserted into a tube channel $145^{VI}$ until second annular flange $136^{VI}$ is registered against, and inside, tube connector channel $146^{VI}$. It should be understood that any method used to assemble the port/tube connector/tube combination is within the scope and spirit of the disclosure.

Once assembled, tube channel $145^{VI}$, defined by tube $128^{VI}$, is in fluid communication with port channel $140^{VI}$. The cross-sectional diameter of port channel $140^{VI}$ may be set to equal the cross-sectional diameter of a relaxed, unstretched, uncompressed and unobstructed section of tube $128^{VI}$. The mechanical interlocking features of port $130^{VI}$ and tube connector $126^{VI}$ along with the tube receiving features of the port/tube connector combination provide a robust, substantially air and fluid tight seal between the port/tube connector combination and the attached tube.

The port/tube connector combination shown in FIGS. 33 and 35 represents a convergent, constricting or non-constricting tube receiving embodiment in that the tube registration surfaces of the port tip that contribute to the formation of the port/tube connector gap converge toward a center line of the tube the further the gap extends from the tube insertion point at the distal end of the port tip. In the case of the embodiment shown in FIGS. 33 and 35, the conical outer wall of port tip $130^{VI}$ tapers inwardly from a distal end to a proximal end, which will permit the wall of the tube end to relax and return toward its center line the further the tube is urged onto the port tip. In this regard, the embodiment is properly classified as a convergent embodiment.

With respect to constriction, if the dimension of the gap at the gap distal end between the cylindrical inner wall $127^{VI}$ of tube connector $126^{VI}$ and the outer wall of port tip $130^{VI}$ is smaller than the thickness of the wall of tube $128^{VI}$, then the distal end of the gap will constrict the wall of tube $128^{VI}$. This constricted portion of the gap will impart compressive, constricting forces against the wall of tube end $129^{VI}$ when the tube is urged over the distal end of the gap. Thus, the embodiment is defined as a convergent, constricting tube embodiment.

If the dimension of the gap at its distal end is equal to, or greater than, the cross-sectional thickness of the tube wall, then the gap will not compress the tube wall and this will be classified properly as non-constricting. For such an embodiment, the width or diameter of the port tip distal end should be greater in dimension than the cross-sectional diameter of the tube channel or lumen to create an anchor point to secure the tube to the port/tube connector combination.

Figure 34:
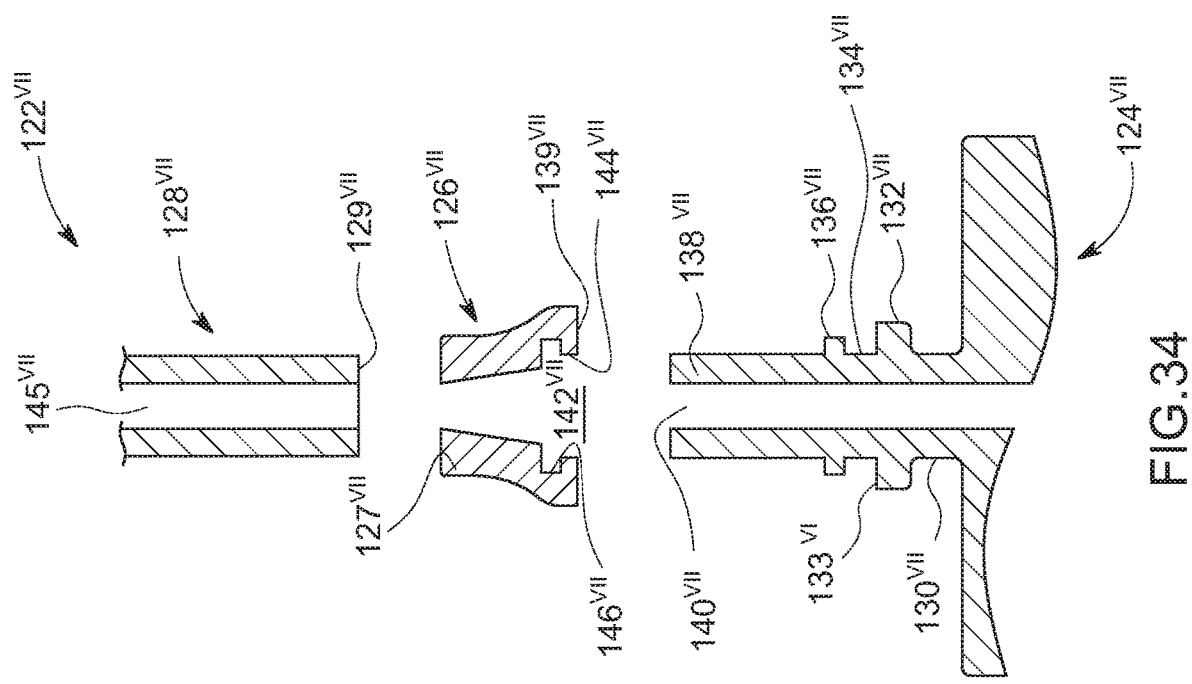
FIG. 34 is a side sectional exploded view of a tube/tube connector/capsule assembly according to yet another embodiment of the disclosure.
Figure 36:
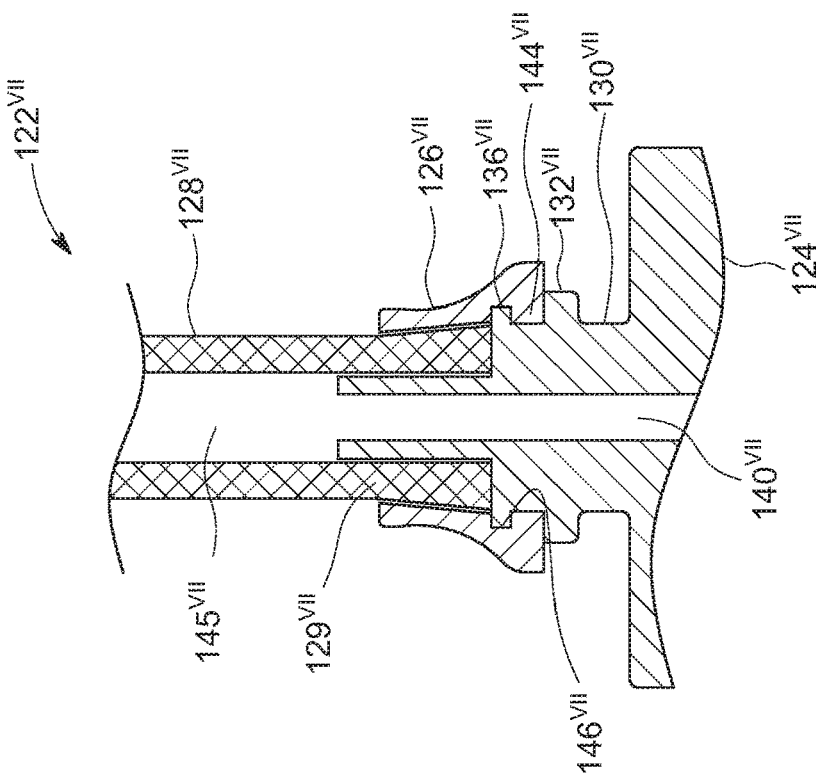
FIG. 36 is a side sectional view of the tube/tube connector/capsule assembly shown in FIG. 34.

Referring now to FIGS. 34 and 36, in yet another embodiment of the disclosure, a capsule assembly designated generally as $122^{VII}$ includes a capsule, shown generally as $124^{VII}$. To form a connection-free junction between capsule $124^{VII}$ and a tube, a modified port $130^{VII}$, which can be either an inlet port or an outlet port, is formed with a first annular flange $132^{VII}$ that extends radially outwardly from the port wall to form a registration surface for tube connector $126^{VII}$. A top annular surface $133^{VII}$ of flange $132^{VII}$ functions as a registration surface for tube connector $126^{VII}$. A second annular flange $136^{VII}$ is formed about port $130^{VII}$ and extends radially outwardly from the port wall. Second annular flange $136^{VII}$ is formed at a point on port $130^{VII}$ more distal from the base of the port than first annular flange $132^{VII}$. The radial length of second annular flange $136^{VII}$ is less than the radial length of first annular flange $132^{VII}$. The combination of first annular flange $132^{VII}$ and second annular flange $136^{VII}$ forms an annular port channel $134^{VII}$ that permits the formation of a mechanical lock between the port and the tube connector as disclosed in more detail below.

A cylindrical port tip $138^{VII}$ extends upwardly from second annular flange $136^{VII}$. The outer wall of port tip $138^{VII}$ is cylindrical in form with a substantially uniform wall thickness and a substantially uniform cross-sectional diameter along its entire length. Port $130^{VII}$ defines a port channel $140^{VII}$ that extends the length of the port and remains essentially uniform in cross section along the length of the port. Port channel $140^{VII}$ is in fluid communication with the capsule filter chamber.

A tube connector, shown generally as $126^{VII}$, defines a connector through-bore $142^{VII}$ defined by a connector inner wall $127^{VI}$. In this embodiment, connector inner wall $127^{VII}$ is tapered in cross section with the smaller end of the taper distal from second annular flange $136^{VII}$. A connector bottom surface $139^{VII}$ is constructed to register against top surface $133^{VII}$ of first annular flange $132^{VII}$. A bottom end of tube connector $126^{VII}$ is formed with an annular wall $144^{VII}$ recessed from inner wall $127^{VII}$ and dimensioned to fit about, and register against, bottom annular port channel $134^{VII}$. The cross-sectional diameter of the channel formed by recessed annular wall $144^{VII}$ is greater than the cross-sectional diameter of through-bore $142^{VII}$.

An annular tube connector channel $146^{VII}$ is formed proximal to recessed annular wall $144^{VII}$ and is dimensioned to receive and register against second annular flange $136^{VII}$. The segment of tube connector $126^{VII}$ in the region of channel $146^{VII}$ and annular wall $144^{VII}$ may have an outer cross-sectional diameter greater than the outer cross-sectional diameter of remainder of the tube connector to provide sufficient tube connector material to create a robust connection between the tube connector and the port that can withstand the mechanical stresses placed upon the connector when connected to port $130^{VII}$. The combination of the two annular flanges of port $130^{VII}$ and the features of tube connector channel $146^{VII}$ that register against the port flanges create a mechanical lock between the port and the tube connector.

When tube connector $126^{VII}$ is secured to port $130^{VII}$, an annular conically-shaped, tube-receiving gap, (tapered in cross-section) is formed between an outer surface of port tip $138^{VII}$ and connector inner wall $127^{VII}$ as shown in FIG. 36. The smaller end of the tapered annular gap is formed distal from second annular flange $136^{VII}$ In one embodiment, the cross-sectional diameter of the small end is dimensioned to be less than the cross-sectional thickness of the wall of a tube, shown generally as $128^{VII}$. This causes the tube wall at a tube end $129^{VII}$ to be compressed when inserted into the gap. The further the tube is inserted into the gap, the more the compression forces increase to secure the tube in the gap until the bottom of the gap is reached. It should be understood that insertion to the bottom of the gap is not required if sufficient compression is provided against the tube wall before the tube end reaches the bottom of the gap. In this regard, tube end $129^{VII}$ may or may not register against a top surface of second annular flange $136^{VII}$.

With respect to the use of compression forces to secure tube $126^{VII}$, additional or alternative means may also be used to secure the tube to the tube connector/port combination including adhesives, friction fit surfaces and mechanical interlocking features. Some adhesion between the tube and tube connector/port combination may also occur if the connection is formed in a one-step molding process whereby the tube connector is formed around a pre-assembled combination of a pre-formed port and pre-formed tube with tube end $129^{VII}$ secured over port tip $138^{VII}$ The preassembled components are placed in a mold for compression or injection molding of the tube connector. Tube connector $126^{VII}$ may also be thermoformed about the tube and port combination.

If each piece is formed separately from the others before assembly, tube connector $126^{VII}$ is formed from materials that have sufficient elastic properties to permit tube connector $126^{VII}$ to be urged over tube end $129^{VII}$ and port tip $130^{VII}$. In such an embodiment, the tube connector can be assembled initially to the port tip by urging tube connector $126^{VII}$ over port tip $130^{VII}$ until tube connector channel $146^{VII}$ is positioned over and against second annular flange $136^{VII}$. Tube end $129^{VII}$ is then urged into the gap formed by the port/tube connector combination.

Alternatively, tube connector $126^{VII}$ can be pre-assembled to tube $128^{VII}$ with tube end $129^{VII}$ inserted into tube connector channel $142^{VII}$, the combination of which is then urged over port tip $138^{VII}$ with the port tip inserted into a tube channel $145^{VII}$ until second annular flange $136^{VII}$ is registered against, and inside, tube connector channel $146^{VII}$. It should be understood that any method used to assemble the port/tube connector/tube combination is within the scope and spirit of the disclosure.

Once assembled, tube channel $145^{VII}$ defined by tube $128^{VII}$, is in fluid communication with port channel $140^{VII}$. The cross-sectional diameter of port channel $140^{VII}$ may be set to equal the cross-sectional diameter of a relaxed, unstretched, uncompressed and unobstructed section of tube $128^{VII}$. The mechanical interlocking features of port $130^{VII}$ and tube connector $126^{VII}$ along with the tube receiving features of the port/tube connector combination provide a robust, substantially air-tight and fluid-tight seal between the port/tube connector combination and the attached tube.

The port/tube connector combination shown in FIGS. 34 and 36 represents a linear, constricting tube-receiving embodiment in that the tube registration surfaces of the port tip that contribute to the formation of the port/tube connector gap are cylindrical in form and do not cause the wall of tube $128^{VII}$ to converge toward, or diverge from, a center line of the tube at any point along the length of port tip $130^{VII}$. In this regard, the embodiment is properly classified as a linear embodiment.

With respect to constriction, because the dimension of the gap formed between the distal end of inner wall $127^{VII}$ and the outer wall of port tip $130^{VII}$, where the tube-receiving gap is at its smallest dimension, is smaller than the thickness of the wall of tube $128^{VII}$, the distal end of the gap will constrict the wall of tube $128^{VII}$. This constricted portion of the gap will impart compressive, constricting forces against the wall of tube end $129^{VII}$ when the tube is urged over the distal end of the gap. The portion of the tube that registers against the features that form the distal end of the gap, when the tube is fully inserted into the gap, will also experience the noted compressive, constricting forces. Thus, the embodiment is defined as a linear, constricting tube embodiment.

The shells, ports, connectors and related structures including rigidifying structures of the various filter assembly embodiments disclosed herein may be injection molded from any thermoplastic materials, including, but not limited to, Polypropylene (PP), Polyethylene (PE), nylon, Polysulfone, Perfluoroalkoxy (PFA) polymer resin, Polycarbonate (PC), Polysulfone (PS), Polyethersulfone (PES), Ethylene-clorotrifluoroethylene copolymer (ECTFE) and mixtures thereof that are generally compatible with the fluids and/or gasses intended to be introduced into the filter assembly as is known in the art. The components may also be constructed from aluminum, stainless steel, metallic alloys, or other metal-based materials. It should be understood other materials and manufacturing methods well known in the art may be used to construct these components.

For purposes of this disclosure, the filter media disclosed herein can be constructed from any material used to make filters and may be constructed in a form selected from the group consisting of filter membranes, loose filter media, hollow fibers, tubular membranes and combinations thereof. As used herein, "filter material" and/or "filtration material" shall mean any filter membrane, filter media, or any other material or substance used to filter fluids including liquids and gases. Specifically, suitable filter materials include illustratively, polytetrafluoroethylene (PTFE), polyvinylidene fluoride (PVDF), polyethylene, hydrophilized polyethersulfone, nylon, cellulose acetate, cellulose nitrate, hydrophilized PVDF, polycarbonate, polyethersulfone (PES), polysulfone (PS), Nylon 6, Nylon 66, regenerated cellulose, mixed esters of cellulose, polycarbonate, polyester, polyacrylonitrile (PAN), polyimide, polyamide, perfluoroalkoxy (PFA) and its derivatives, Ethylene-clorotrifluoroethylene copolymer (ECTFE), polypropylene (PP), high density polyethylene (HDPE), ultra-high molecular weight polyethylene (UHMWPE or UPE) and mixtures thereof, as well as others well known in the art. Pore sizes and porosities are selected based upon the particular application as is well known in the art.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

What we claim as new and desire to secure by United States Letters Patent is:

1. A filter capsule-tube assembly comprising:
   a capsule shell having a housing wall defining a filter chamber with a port extending from the shell that defines a port channel in fluid communication with the filter chamber, wherein the port has a distal end segment with a smooth, continuous conical, tube-receiving outer wall that ends in a port tip, wherein the port tip has a smaller cross-sectional diameter than an end of the distal end segment proximal to the capsule shell;
   a tube connector having a connector inner wall defining a connector through-bore, wherein the tube connector is superposed about the port, wherein a tube-receiving channel is formed between the connector inner wall and the port outer wall; and,
   a flexible tube having a tube wall with a defined thickness and defining a tube lumen, wherein the tube is secured over the port distal end segment and within the tube-receiving channel in a friction fit, wherein the tube lumen, port channel and filter chamber are in fluid communication.

2. The filter capsule-tube assembly of claim 1, wherein the port channel has a cross-sectional diameter substantially the same as the cross-sectional diameter of the tube lumen at a relaxed, or unstressed portion of the tube.

3. The filter capsule-tube assembly of claim 1, wherein the connector inner wall is cylindrical in cross-section and dimensioned to be superposed about, and to secure the flexible tube to, the port outer wall.

4. The filter capsule-tube assembly of claim 1, wherein the port has a first annual flange extending radially outwardly from the port proximal to the capsule shell and a second annular flange extending radially outwardly from the port distal from the first annular flange, wherein the first and second annular flanges are spaced to form an annular port channel, and wherein a bottom end of the tube connector is formed with an annular tube connector wall extending radially inwardly from the connector inner wall and dimensioned to fit within, and register against, the annular port channel.

5. The filter capsule-tube assembly of claim 4 wherein an annular tube connector channel is formed on the connector inner wall adjacent the tube connector wall and dimensioned to envelope the second annular flange of the port.

6. The filter capsule-tube assembly of claim 1 wherein the connector inner wall is conical, tapered in cross-section, with the cross-sectional diameter of a top end of the connector inner wall larger than the cross-sectional diameter of a bottom end of the connector inner wall, and wherein the connector inner wall is dimensioned to be superposed about, and to secure the flexible tube to, the port outer wall.

7. The filter capsule-tube assembly of claim 1, wherein the connector inner wall is conical, tapered in cross-section, with the cross-sectional diameter of a top end of the connector inner wall smaller than the cross-sectional diameter of a bottom end of the connector inner wall, and wherein the connector inner wall is dimensioned to be superposed about, and to secure the flexible tube to, the port outer wall.

8. A filter capsule-tube assembly comprising:
   a capsule shell having a housing wall defining a filter chamber with a port extending from the shell that defines a port channel in fluid communication with the filter chamber, wherein the port has a conical outer wall that ends in a port tip with a distal end of the port having a larger cross-sectional diameter than an end proximal to the capsule shell;
   a tube connector having a connector inner wall defining a connector through-bore, wherein the tube connector is superposed about the port, wherein a tube receiving channel is formed between the connector inner wall and the port outer wall; and,
   a flexible tube having a tube wall with a defined thickness and defining a tube lumen, wherein the tube is secured over the port and within the tube-receiving channel, wherein the tube lumen, port channel and filter chamber are in fluid communication.

9. The filter capsule-tube assembly of claim 8, wherein the port channel has a cross-sectional diameter substantially the same as the cross-sectional diameter of the tube lumen at a relaxed, or unstressed portion of the tube.

10. The filter capsule-tube assembly of claim 8, wherein the connector inner wall is cylindrical in cross-section and dimensioned to be superposed about, and to secure the flexible tube to, the port outer wall.

11. The filter capsule-tube assembly of claim 8, wherein the port has a first annual flange extending radially outwardly from the port proximal to the capsule shell and a second annular flange extending radially outwardly from the port distal from the first annular flange, wherein the first and second annular flanges are spaced to form an annular port channel, and wherein a bottom end of the tube connector is formed with an annular tube connector wall extending radially inwardly from the connector inner wall and dimensioned to fit within, and register against, the annular port channel.

12. The filter capsule-tube assembly of claim 11 wherein an annular tube connector channel is formed on the connector inner wall adjacent the tube connector wall and dimensioned to envelope the second annular flange of the first port.

13. The filter capsule-tube assembly of claim 8, wherein the connector inner wall is conical, tapered in cross-section, with the cross-sectional diameter of a top end of the connector inner wall larger than the cross-sectional diameter of a bottom end of the connector inner wall, and wherein the connector inner wall is dimensioned to be superposed about, and to secure the flexible tube to, the port outer wall.

14. The filter capsule-tube assembly of claim 8, wherein the connector inner wall is conical, tapered in cross-section, with the cross-sectional diameter of a top end of the connector inner wall smaller than the cross-sectional diameter of a bottom end of the connector inner wall, and wherein the connector inner wall is dimensioned to be superposed about, and to secure the flexible tube to, the port outer wall.

15. A filter capsule-tube assembly comprising:
- a capsule shell having a housing wall defining a filter chamber with a port extending from the shell that defines a channel in fluid communication with the filter chamber, wherein the port has a distal end segment with a smooth, continuous, tube-receiving cylindrical outer wall that ends in a port tip;
- a tube connector having a connector inner wall defining a connector through-bore, wherein the tube connector is superposed about the port, wherein a tube-receiving channel is formed between the connector inner wall and the port outer wall; and,
- a flexible tube having a tube wall with a defined thickness and defining a tube lumen, wherein the tube is secured over the port distal end segment and within the tube-receiving channel in a friction fit, wherein the tube lumen, port channel and filter chamber are in fluid communication.

16. The filter capsule-tube assembly of claim 15, wherein the connector inner wall is cylindrical in cross-section and dimensioned to be superposed about, and to secure the flexible tube to, the port outer wall.

17. The filter capsule-tube assembly of claim 15, wherein the port has a first annual flange extending radially outwardly from the port proximal to the capsule shell and a second annular flange extending radially outwardly from the port distal from the first annular flange, wherein the first and second annular flanges are spaced to form an annular port channel, and wherein a bottom end of the tube connector is formed with an annular tube connector wall extending radially inwardly from the connector inner wall and dimensioned to fit within, and register against, the annular port channel.

18. The filter capsule-tube assembly of claim 17, wherein an annular tube connector channel is formed on the connector inner wall adjacent the tube connector wall and dimensioned to envelope the second annular flange of the port.

19. The filter capsule-tube assembly of claim 15 wherein the connector inner wall is conical, tapered in cross-section, with the cross-sectional diameter of a top end of the connector inner wall larger than the cross-sectional diameter of a bottom end of the connector inner wall, and wherein the connector inner wall is dimensioned to be superposed about, and to secure the flexible tube to, the port outer wall.

20. The filter capsule-tube assembly of claim 15, wherein the connector inner wall is conical, tapered in cross-section, with the cross-sectional diameter of a top end of the connector inner wall smaller than the cross-sectional diameter of a bottom end of the connector inner wall, and wherein the connector inner wall is dimensioned to be superposed about, and to secure the flexible tube to, the port outer wall.

* * * * *